(12) United States Patent
Moriya et al.

(10) Patent No.: US 8,537,179 B2
(45) Date of Patent: Sep. 17, 2013

(54) IMAGE PROCESSING APPARATUS AND METHOD AND IMAGE DISPLAY APPARATUS

(75) Inventors: Shotaro Moriya, Tokyo (JP); Noritaka Okuda, Tokyo (JP); Satoshi Yamanaka, Tokyo (JP); Koji Minami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 751 days.

(21) Appl. No.: 12/746,129

(22) PCT Filed: Dec. 2, 2009

(86) PCT No.: PCT/JP2009/006531
§ 371 (c)(1),
(2), (4) Date: Jun. 3, 2010

(87) PCT Pub. No.: WO2010/073496
PCT Pub. Date: Jul. 1, 2010

(65) Prior Publication Data
US 2011/0050700 A1 Mar. 3, 2011

(30) Foreign Application Priority Data
Dec. 22, 2008 (JP) .................................. 2008-325259

(51) Int. Cl.
*G09G 5/00* (2006.01)
*G06T 17/00* (2006.01)
*G06K 9/40* (2006.01)
*G06K 9/32* (2006.01)

(52) U.S. Cl.
USPC ........... 345/660; 382/254; 382/260; 382/299; 345/428

(58) Field of Classification Search
None
See application file for complete search history.

(56) References Cited

U.S. PATENT DOCUMENTS 5,241,387 A 8/1993 Fujikawa et al.
5,479,215 A 12/1995 Chmielewski et al.
(Continued)

FOREIGN PATENT DOCUMENTS

EP 0 323 125 A1 12/1988
EP 1 530 364 A1 5/2005
(Continued)

OTHER PUBLICATIONS

Watanabe, A.; Taguchi, A., "Improvement of the image enlargement method based on the Laplacian pyramid representation," Circuits and Systems, 2004. MWSCAS '04. The 2004 47th Midwest Symposium on , vol. 2, No., pp. 11-585,11-588 vol. 2, Jul. 25-28, 2004.*

(Continued)

*Primary Examiner* — Kee M Tung
*Assistant Examiner* — Zhengxi Liu
(74) *Attorney, Agent, or Firm* — Birch, Stewart, Kolasch & Birch, LLP.

(57) ABSTRACT

A first intermediate image generating means (1) generates an intermediate image (D1) by extracting a component of an input image (DIN) in a particular frequency band; a second intermediate image generating means (2) generates an intermediate image (D2) having a frequency component higher than intermediate image (D1); an intermediate image processing means (3M) generates an intermediate image (D3M) by suppressing low-level noise included in intermediate image (D1); an intermediate image processing means (3H) generates an intermediate image (D3H) by suppressing low-level noise included in intermediate image (D2); and an adding means (4) adds the input image (DIN) and intermediate image (D3M) and intermediate image (D3H) together to obtain a final output image (DOUT). Even if the input image includes a fold-over component on the high-frequency side or does not include an adequate high-frequency component, an enhanced image can be obtained without enhancing noise.

12 Claims, 21 Drawing Sheets

(56) References Cited

U.S. PATENT DOCUMENTS

| | | | |
|---|---|---|---|
| 5,717,789 A * | 2/1998 | Anderson et al. | 382/254 |
| 6,005,983 A | 12/1999 | Anderson et al. | |
| 6,738,528 B1 | 5/2004 | Nio et al. | |
| 2006/0279583 A1 | 12/2006 | Obara | |
| 2007/0237425 A1 | 10/2007 | Taguchi et al. | |
| 2009/0232401 A1 | 9/2009 | Yamashita et al. | |

FOREIGN PATENT DOCUMENTS

| | | |
|---|---|---|
| JP | 4-207292 A | 7/1992 |
| JP | 7-143366 A | 6/1995 |
| JP | 7-177386 A | 7/1995 |
| JP | 8-111792 A | 4/1996 |
| JP | 8-204995 A | 8/1996 |
| JP | 9-44651 A | 2/1997 |
| JP | 9-46576 A | 2/1997 |
| JP | 10-257356 A | 9/1998 |
| JP | 11-75205 A | 3/1999 |
| JP | 2000-50275 A | 2/2000 |
| JP | 2002-325186 A | 11/2002 |
| JP | 2006-217385 A | 8/2006 |
| JP | 2006-340006 A | 12/2006 |
| JP | 2006-349757 A | 12/2006 |
| JP | 2007-110303 A | 4/2007 |
| JP | 2008-125112 A | 5/2008 |

OTHER PUBLICATIONS

Takahashi, Yasumasa, and Akira Taguchi. "An enlargement method of digital images based on Laplacian pyramid representation." Electronics and Communications in Japan (Part II: Electronics) 84.6 (2001): 40-49.*

Sekiwa, Dais&E., A. Taguchi, and Y. Murata. "Enlargement of digital image by Laplacian pyramid using neural network." Trans IEICE J 80 (2002): 1499-1508.*

"Band-pass filters" http://www.allaboutcircuits.com/vol_2/chpt_8/4.html. Archived on Mar. 9, 2005. Retrieved on May 3, 2013 from <http://web.archive.org/web/20050309093420/http://www.allaboutcircuits.com/vol_2/chpt_8/4.html>.*

Takahashi, Yasumasa; Taguchi, A., "An enlargement method of digital images with the prediction of high-frequency components," Acoustics, Speech, and Signal Processing (ICASSP), 2002 IEEE International Conference on , vol. 4, No., pp. IV-3700,IV-3703, May 13-17, 2002.*

Takahashi, Yasumasa, and Akira Taguchi. "An arbitrary scale image enlargement method with the prediction of high-frequency components." Electronics and Communications in Japan (Part III: Fundamental Electronic Science) 86.8 (2003): 41-51.*

Hentschel, Christian, and Stefan Schiemenz. "Spatial up-scaler with nonlinear edge enhancement for rational factors." Consumer Electronics, 2007. ICCE 2007. Digest of Technical Papers. International Conference on. IEEE, 2007.*

Shotaro Moriya et al.—Deblurring for Enlarged Image, Consumer Electronics—Berlin (ICCE-Berlin), 2011 IEEE International Conference on, IEEE, Sep. 6, 2011, pp. 249-252.

Atsushi Shimura et al., "A Digital Image Enlarging Method without Edge Effect by Using the E-Filter", Journal of IEICE, vol. J86-A, No. 5, pp. 540-551, Mar. 1, 2003.

H. Greenspan et al. "Image enhancement by non-linear extrapolation in frequency space", SPIE vol. 2182, pp. 2-13, Feb. 1994.

H. Greenspan et al., "Image Enhancement by Nonlinear Extrapolation in Frequency Space", IEEE Transactions in Image Processing, vol. 9, No. 6, Jun. 1, 2000, pp. 1035-1048.

* cited by examiner

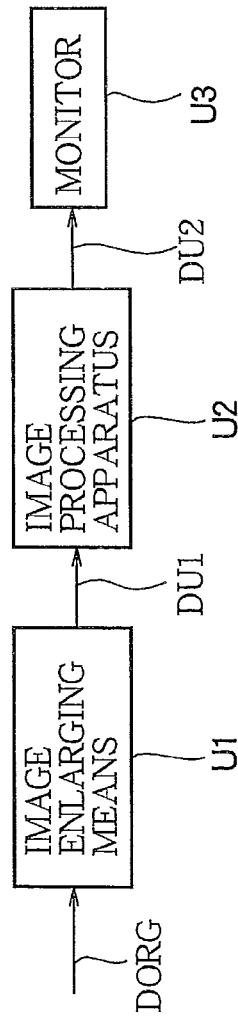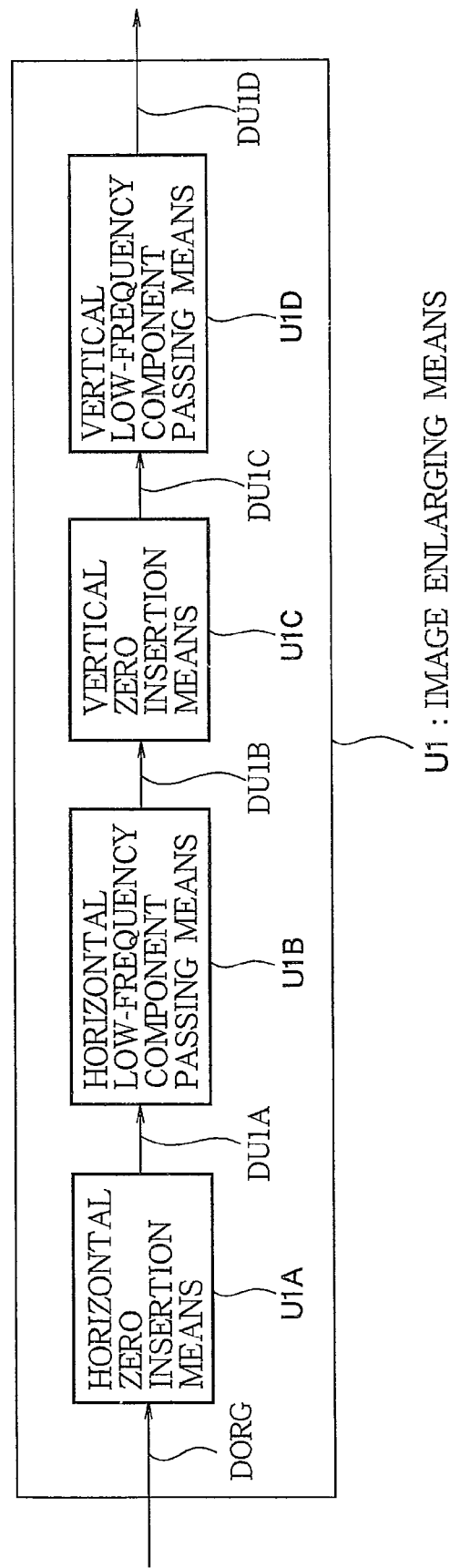

FIG.11 (A)

| A11 | A21 | A31 | A41 |
|-----|-----|-----|-----|
| A12 | A22 | A32 | A42 |
| A13 | A23 | A33 | A43 |
| A14 | A24 | A34 | A44 |

FIG.11 (B)

| A11 | 0 | A21 | 0 | A31 | 0 | A41 | 0 |
|-----|---|-----|---|-----|---|-----|---|
| A12 | 0 | A22 | 0 | A32 | 0 | A42 | 0 |
| A13 | 0 | A23 | 0 | A33 | 0 | A43 | 0 |
| A14 | 0 | A24 | 0 | A34 | 0 | A44 | 0 |

FIG.11 (C)

| B11 | B21 | B31 | B41 | B51 | B61 | B71 | B81 |
|-----|-----|-----|-----|-----|-----|-----|-----|
| B12 | B22 | B32 | B42 | B52 | B62 | B72 | B82 |
| B13 | B23 | B33 | B43 | B53 | B63 | B73 | B83 |
| B14 | B24 | B34 | B44 | B53 | B64 | B74 | B84 |

FIG.11 (D)

| B11 | B21 | B31 | B41 | B51 | B61 | B71 | B81 |
|-----|-----|-----|-----|-----|-----|-----|-----|
| 0 | 0 | 0 | 0 | 0 | 0 | 0 | 0 |
| B12 | B22 | B32 | B42 | B52 | B62 | B72 | B82 |
| 0 | 0 | 0 | 0 | 0 | 0 | 0 | 0 |
| B13 | B23 | B33 | B43 | B53 | B63 | B73 | B83 |
| 0 | 0 | 0 | 0 | 0 | 0 | 0 | 0 |
| B14 | B24 | B34 | B44 | B53 | B64 | B74 | B84 |
| 0 | 0 | 0 | 0 | 0 | 0 | 0 | 0 |

FIG.11 (E)

| C11 | C21 | C31 | C41 | C51 | C61 | C71 | C81 |
|-----|-----|-----|-----|-----|-----|-----|-----|
| C12 | C22 | C32 | C42 | C52 | C62 | C72 | C82 |
| C13 | C23 | C33 | C43 | C53 | C63 | C73 | C83 |
| C14 | C24 | C34 | C44 | C54 | C64 | C74 | C84 |
| C15 | C25 | C35 | C45 | C55 | C65 | C75 | C85 |
| C16 | C26 | C36 | C46 | C56 | C66 | C76 | C86 |
| C17 | C27 | C37 | C47 | C57 | C67 | C77 | C87 |
| C18 | C28 | C38 | C48 | C58 | C68 | C78 | C88 |

SPECTRAL INTENSITY

FREQUENCY SPECTRUM OF DORG

SPECTRAL INTENSITY

FREQUENCY SPECTRUM OF DU1A

FREQUENCY RESPONSE

FREQUENCY RESPONSE OF HORIZONTAL LOW-FREQUENCY COMPONENT PASSING MEANS U1B

SPECTRAL INTENSITY

FREQUENCY SPECTRUM OF DU1B

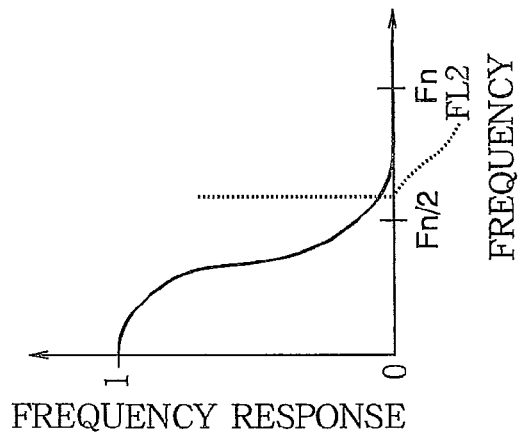
FIG. 13(A) FREQUENCY SPECTRUM OF INPUT IMAGE DIN
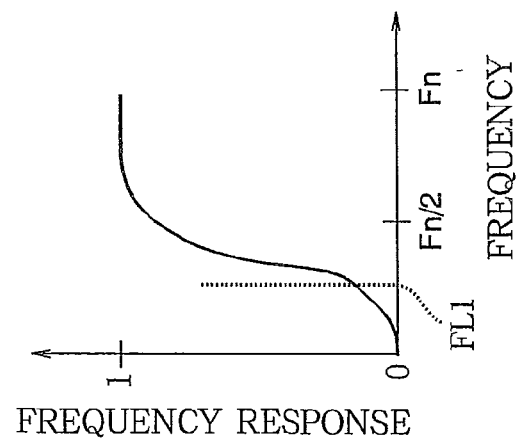
FIG. 13(B) FREQUENCY RESPONSE OF HIGH-FREQUENCY COMPONENT IMAGE GENERATING MEANS 1A
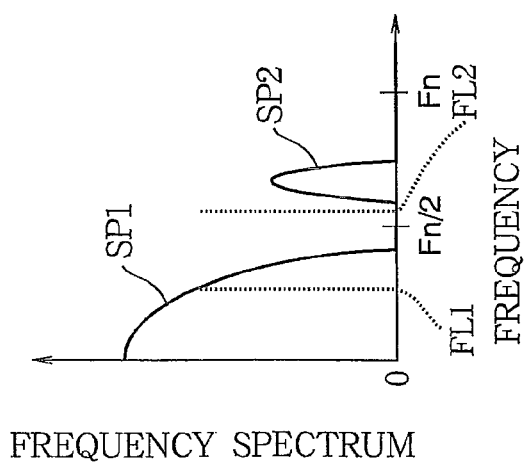
FIG. 13(C) FREQUENCY RESPONSE OF LOW-FREQUENCY COMPONENT IMAGE GENERATING MEANS 1B

FREQUENCY SPECTRUM OF IMAGE D2B

FREQUENCY RESPONSE OF HIGH-FREQUENCY COMPONENT IMAGE GENERATING MEANS 2B

FREQUENCY SPECTRUM OF NON-LINEARLY PROCESSED IMAGE D2A

IMAGE PROCESSING APPARATUS AND METHOD AND IMAGE DISPLAY APPARATUS

FIELD OF THE INVENTION

The present invention relates to an image processing apparatus and an image processing method that enhance an input image by, for example, generating and adding high-frequency components to an enlarged input image that is an enlargement of an original image, in order to obtain an output image with a high perceived resolution, and to an image display apparatus using the image processing apparatus and image processing method.

BACKGROUND ART

Images are generally reproduced and displayed after image signals representing the image have been subjected to appropriate image processing.

In the image processing apparatus disclosed in patent document 1, for example, following multiresolution decomposition, a desired frequency band is enhanced by specifying an enhancement coefficient for the image in the desired frequency band according to the signal of the image in a lower frequency band.

PRIOR ART REFERENCES

Patent Documents

Patent document 1: Japanese Patent Application Publication No. H9-44651

SUMMARY OF THE INVENTION

Problems to be Solved by the Invention

In the image processing apparatus in which an appropriate enhancement coefficient is specified for the constituent image in a desired frequency band of the decomposed multiresolution image, for some input images the enhancement processing is inappropriate or inadequate and output images with proper picture quality cannot be obtained.

If an image that has been subjected to enlargement processing is input as an input image, for example, part of the frequency spectrum of the image before the enhancement processing folds over and appears as a fold-over component on the high-frequency side of the frequency spectrum of the input image. Simply enhancing the high-frequency component is then inappropriate, because the fold-over component is enhanced. If the frequency band is limited so as to enhance only a frequency band excluding the fold-over component, however, then enhancement of the high-frequency side of the frequency spectrum must be avoided, and in consequence, the enhancement processing is inadequate.

In addition, if the input image includes noise, noise overlapping the frequency band of the constituent image is enhanced.

Furthermore, when the input image includes noise, if the noise included in the input image is eliminated by noise suppression in advance, the high-frequency side of the frequency spectrum is also eliminated by the noise suppression. Attempts to extract the high-frequency component therefore fail, which may make it impossible to carry out adequate image enhancement processing.

Means of Solution of the Problems

An image processing apparatus according to the invention includes:

a first intermediate image generating means for generating a first intermediate image by extracting components of an input image in a particular frequency band;

a second intermediate image generating means for generating a second intermediate image from the first intermediate image;

a first intermediate image processing means for generating a third intermediate image by suppressing low-level noise included in the first intermediate image;

a second intermediate image processing means for generating a fourth intermediate image by suppressing low-level noise included in the second intermediate image; and an adding means for adding the input image and the third intermediate image and the fourth intermediate image together.

Effect of the Invention

According to the present invention, adequate image enhancement processing can be carried out without increasing or enhancing noise.

BRIEF DESCRIPTION OF THE DRAWINGS

FIG. 9 is a block diagram illustrating an exemplary structure of an image display apparatus utilizing the image processing apparatus according to the present invention.

FIG. 10 is a block diagram illustrating an exemplary structure of the image enlarging means U1 in FIG. 9.

FIGS. 11(A) to 11(E) are pixel arrangement diagrams illustrating the operation of the image enlarging means U1 in FIG. 10.

FIGS. 13(A) to 13(E) are diagrams showing frequency spectra and frequency responses to illustrate the operation of the first intermediate image generating means 1 in FIG. 1.

MODE FOR CARRYING OUT THE INVENTION

First Embodiment

Figure 1:
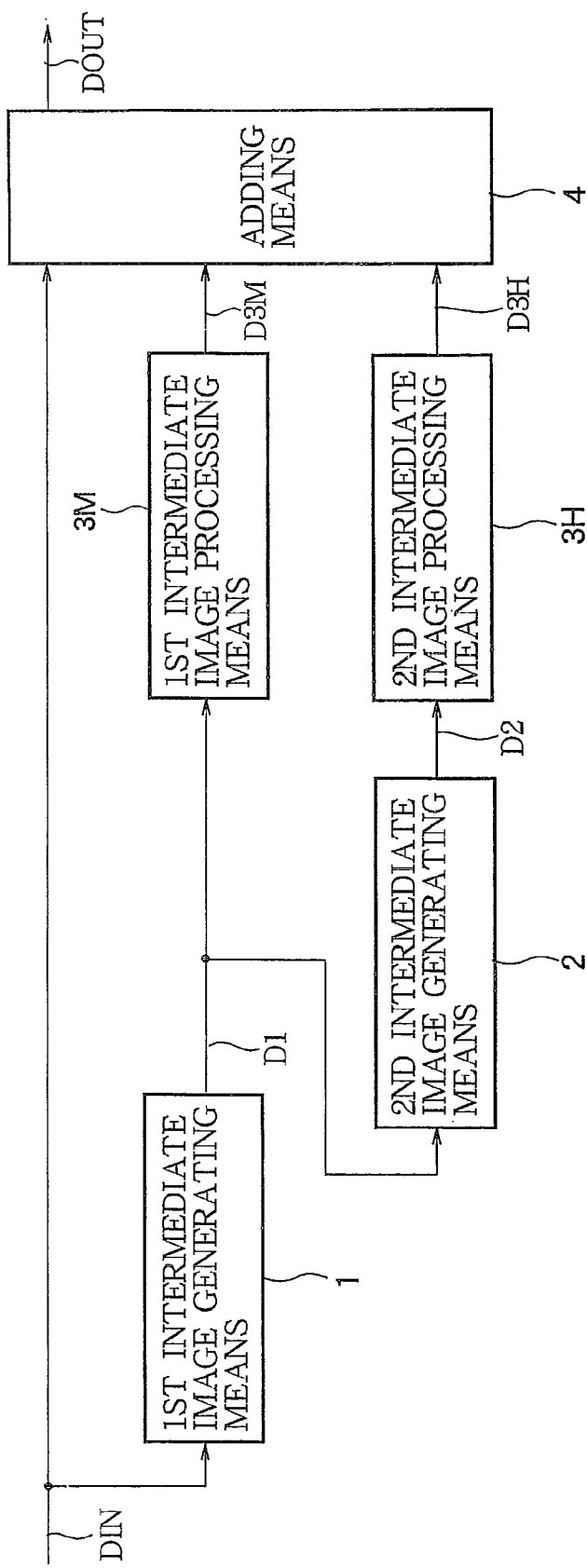
FIG. 1 is a block diagram illustrating the structure of an image processing apparatus according to a first embodiment of the invention.

FIG. 1 is a diagram illustrating an exemplary structure of an image processing apparatus according to the first embodiment of the invention; the illustrated image processing apparatus can be utilized as, for example, part of an image display apparatus.

The illustrated image processing apparatus includes a first intermediate image generating means 1, a second intermediate image generating means 2, a first intermediate image processing means 3M, a second intermediate image processing means 3H, and an adding means 4.

The first intermediate image generating means 1 generates an intermediate image D1 (the first intermediate image) by extracting components in a particular frequency band (components from a first frequency (a first predetermined frequency) to a second frequency (a second predetermined frequency)) from an input image DIN.

The second intermediate image generating means 2 generates an intermediate image D2 (the second intermediate image) by carrying out certain processing, which will be described later, on intermediate image D1.

The first intermediate image processing means 3M generates an intermediate image D3M (the third intermediate image) by carrying out certain processing, which will be described later, on intermediate image D1.

The second intermediate image processing means 3H generates an intermediate image D3H (the fourth intermediate image) by carrying out certain processing, which will be described later, on intermediate image D2.

The adding means 4 adds the input image DIN, intermediate image D3M, and intermediate image D3H together. The image obtained as the resulting sum by the adding means 4 is output as a final output image DOUT.

Figure 2:
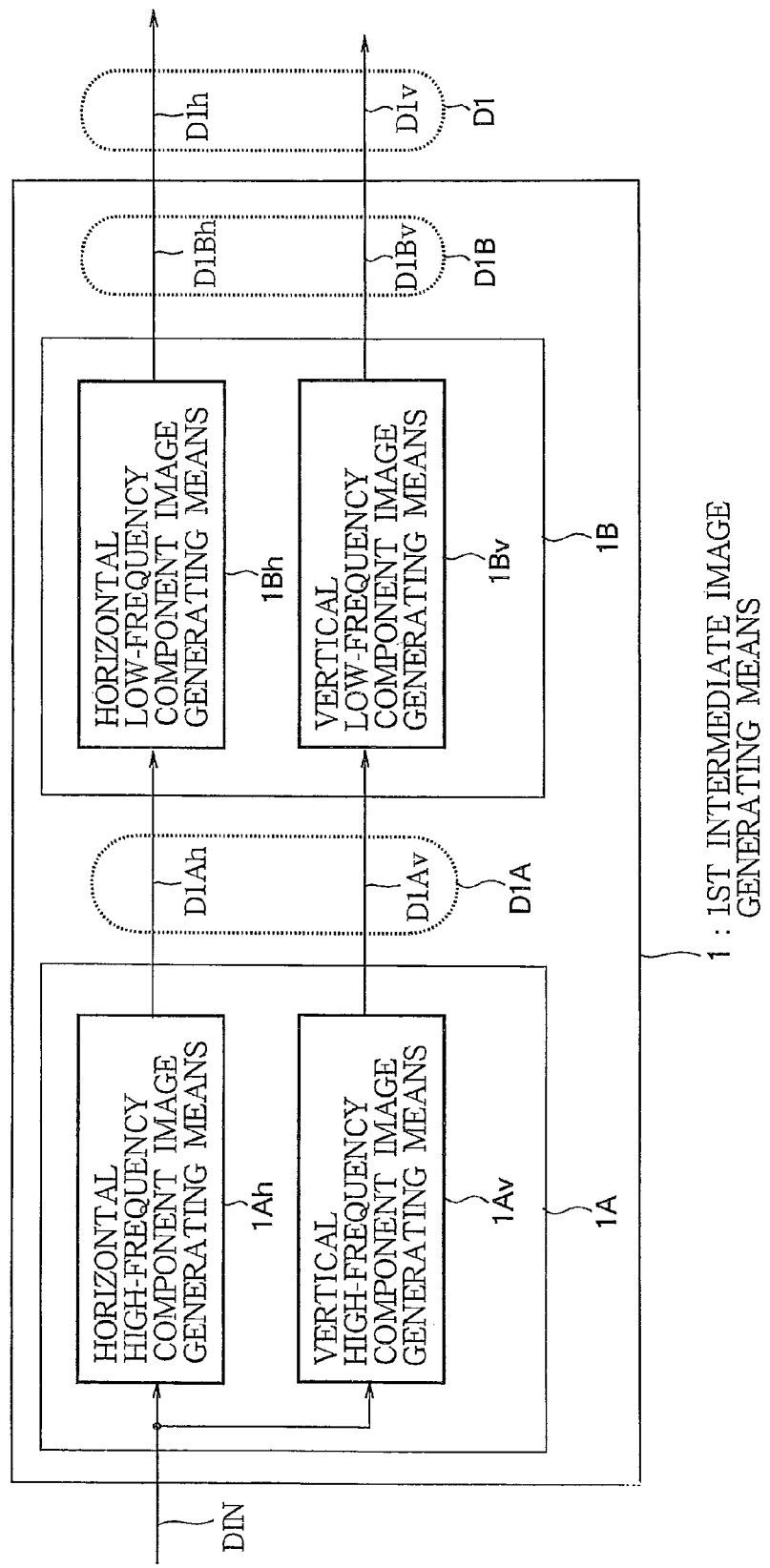
FIG. 2 is a block diagram illustrating an exemplary structure of the first intermediate image generating means 1 in FIG. 1.

FIG. 2 is a diagram illustrating an exemplary structure of the first intermediate image generating means 1. The illustrated first intermediate image generating means 1 includes a high-frequency component image generating means 1A for generating an image D1A by extracting only the high-frequency component above the first frequency from the input image DIN and a low-frequency component image generating means 1B for generating an image D1B by extracting only the low-frequency component below the second frequency from image D1A. The high-frequency component image generating means 1A and the low-frequency component image generating means 1B form a band-pass filter means for extracting the component in a particular frequency band. Image D1B is output from the first intermediate image generating means 1 as intermediate image D1.

Figure 3:
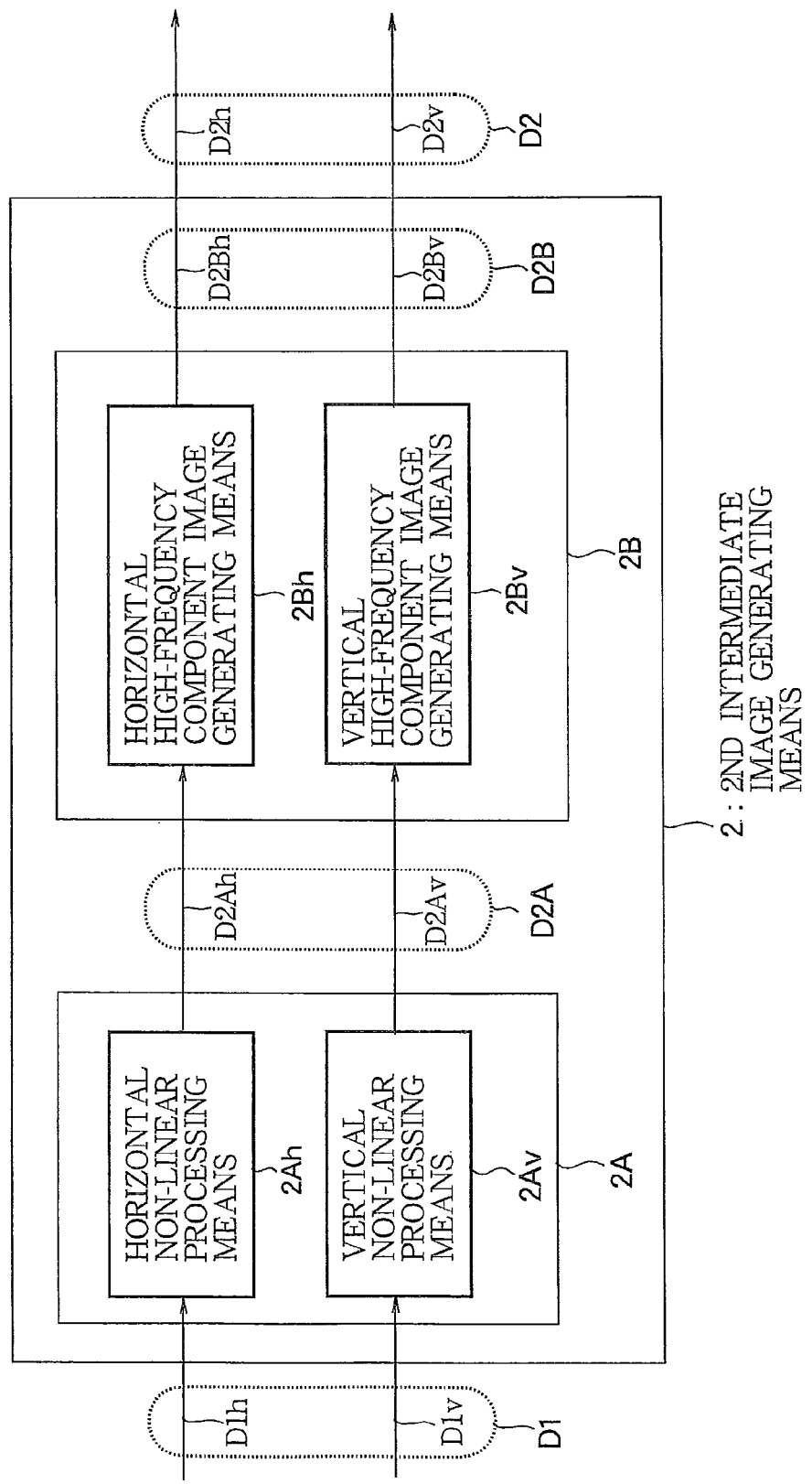
FIG. 3 is a block diagram illustrating an exemplary structure of the second intermediate image generating means 2 in FIG. 1.

FIG. 3 is a diagram illustrating an exemplary structure of the second intermediate image generating means 2; the illustrated second intermediate image generating means 2 includes a non-linear processing means 2A for outputting an image D2A obtained by performing non-linear processing, which will be described later, on intermediate image D1 and a high-frequency component image generating means 2B for outputting an image D2B obtained by extracting only the high-frequency component above a third frequency (the third predetermined frequency) from image D2A. Image D2B is output from the second intermediate image generating means 2 as intermediate image D2.

Figure 4:
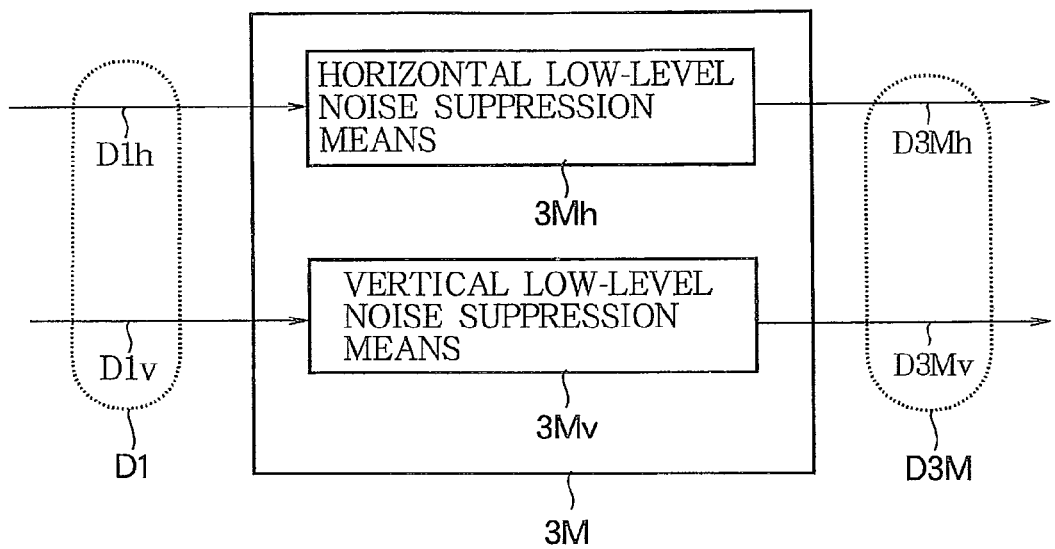
FIG. 4 is a block diagram illustrating an exemplary structure of the first intermediate image processing means 3M in FIG. 1.

FIG. 4 is a diagram illustrating an exemplary structure of the first intermediate image processing means 3M; the illustrated first intermediate image processing means 3M includes a horizontal low-level noise suppression means 3Mh and a vertical low-level noise suppression means 3Mv. The first intermediate image processing means 3M performs processing, which will be described later, on intermediate image D1. The result is output from the first intermediate image processing means 3M as intermediate image D3M.

Figure 5:
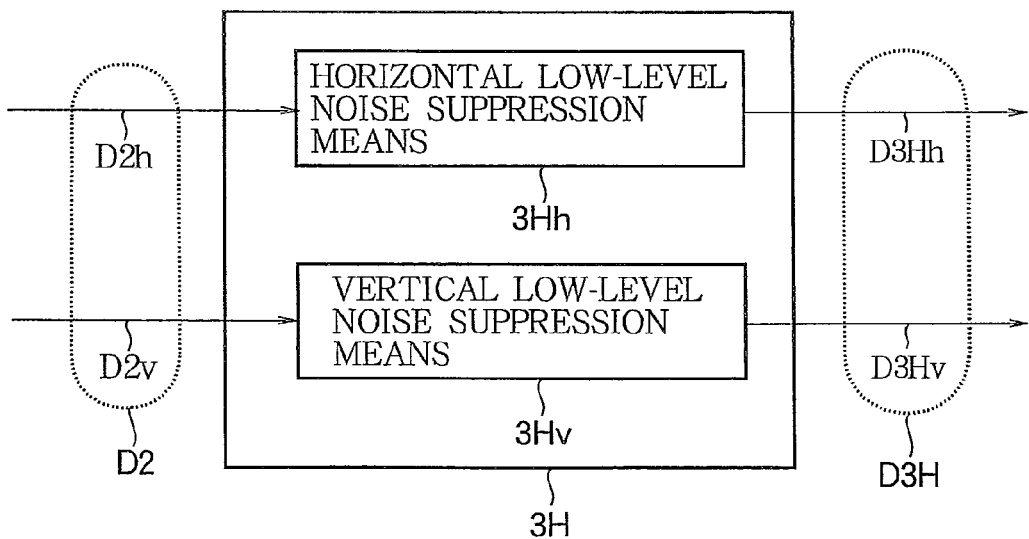
FIG. 5 is a block diagram illustrating an exemplary structure of the second intermediate image processing means 3H in FIG. 1.

FIG. 5 is a diagram illustrating an exemplary structure of the second intermediate image processing means 3H; the illustrated second intermediate image processing means 3H includes a horizontal low-level noise suppression means 3Hh and a vertical low-level noise suppression means 3Hv. The second intermediate image processing means 3H performs processing, which will be described later, on the intermediate image D2. The result is output from the second intermediate image processing means 3H as intermediate image D3H.

The adding means 4 generates the final output image DOUT by adding intermediate image D3M and intermediate image D3H to the input image DIN.

The operation of the image processing apparatus in the first embodiment of this invention will be described in detail below.

First the detailed operation of the first intermediate image generating means 1 will be described.

In the first intermediate image generating means 1, the high-frequency component image generating means 1A generates image D1A by extracting only the high-frequency component of the input image DIN above the first frequency. The high-frequency component can be extracted by performing high-pass filter processing. The high-frequency component of the image is extracted in the horizontal direction and vertical direction separately. The high-frequency component image generating means 1A includes a horizontal high-frequency component image generating means 1Ah for generating an image D1Ah by performing horizontal high-pass filter processing on the input image DIN to extract a horizontal high-frequency component above a first horizontal frequency only in the horizontal direction and a vertical high-frequency component image generating means 1Av for generating an image D1Av by performing vertical high-pass filter processing to extract a vertical high-frequency component above a first vertical frequency only in the vertical direction; image D1A includes image D1Ah and image D1Av.

Next, in the first intermediate image generating means 1, the low-frequency component image generating means 1B generates an image D1B by extracting only the low-frequency component of image D1A below the second frequency. The low-frequency component can be extracted by performing low-pass filter processing. The low-frequency component is extracted in the horizontal direction and the vertical direction separately. The low-frequency component image generating means 1B includes a horizontal low-frequency component image generating means 1B for generating an image D1Bh by performing horizontal low-pass filter processing on image D1Ah to extract a horizontal low-frequency component below a second horizontal frequency and a vertical low-frequency component image generating means 1Bv for generating an image D1Bv by performing vertical low-pass filter processing on image D1Av to extract a vertical low-frequency component below a second vertical frequency; image D1B includes image D1Bh and image D1Bv. Image D1B is output from the first intermediate image generating means 1 as intermediate image D1. Intermediate image D1 includes an image D1h corresponding to image D1Bh and an image D1v corresponding to image D1Bv.

Next the detailed operation of the second intermediate image generating means 2 will be described.

In the second intermediate image generating means 2, the non-linear processing means 2A generates image D2A by performing non-linear processing, which will be described later, on intermediate image D1. The non-linear processing is performed in the horizontal direction and vertical direction separately. The non-linear processing means 2A includes a horizontal non-linear processing means 2Ah for generating an image D2Ah by performing non-linear processing, which will be described later, on image D1h, and a vertical non-linear processing means 2Av for generating an image D2Av by performing non-linear processing, which will be described later, on image D1v; image D2A includes image D2Ah and image D2Av.

The operation of the non-linear processing means 2A will now be described in further detail. The horizontal non-linear processing means 2Ah and the vertical non-linear processing means 2Av included in the non-linear processing means 2A have the same structure. The horizontal non-linear processing means 2Ah performs processing in the horizontal direction, and the vertical non-linear processing means 2Av performs processing in the vertical direction.

Figure 6:
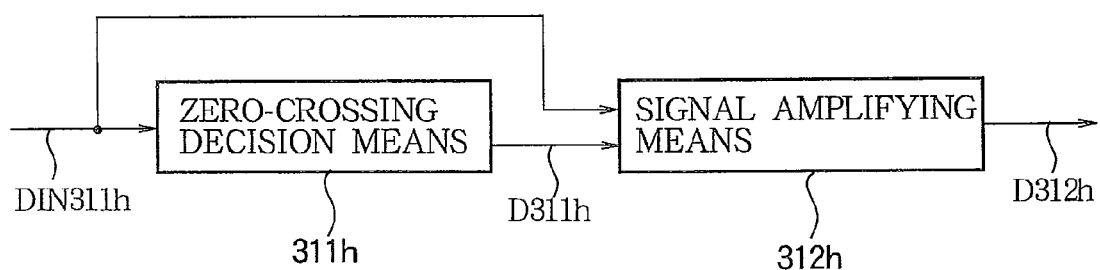
FIG. 6 is a block diagram illustrating an exemplary structure of the horizontal non-linear processing means 2Ah in FIG. 3.

FIG. 6 is a diagram illustrating an exemplary structure of the horizontal non-linear processing means 2Ah. The illustrated horizontal non-linear processing means 2Ah includes a zero-crossing decision means 311h and a signal amplifying means 312h. The horizontal non-linear processing means 2Ah receives image D1h as an input image DIN311h.

The zero-crossing decision means 311h checks the pixel values in the input image DIN311h for changes in the horizontal direction. A point where the pixel value changes from positive to negative or from negative to positive is identified as a zero-crossing point, and the positions of the pixels preceding and following the zero-crossing point (the adjacently preceding and following pixels) are reported to the signal amplifying means 312h by a signal D311h. Preceding and following herein means the preceding and following positions in the sequence in which signals are supplied: the positions to the left and right when the pixel signals are supplied from left to right in the horizontal direction, or the positions above and below when the pixel signals are supplied from top to bottom in the vertical direction. The zero-crossing decision means 311h in the horizontal non-linear processing means 2Ah recognizes the pixels to the left and right of the zero-crossing point as the pixels preceding and following the zero-crossing point.

The signal amplifying means 312h identifies the pixels preceding and following the zero-crossing point (the adjacently preceding and following pixels) in accordance with the signal D311h and generates a non-linear image D312h by amplifying the pixel values (increasing the absolute values) of only the pixels preceding and following the zero-crossing point. The amplification factor for the pixel values of the pixels preceding and following the zero-crossing point is a value greater than 1; the amplification factor for the pixel values of other pixels is 1.

The non-linear image D312h is output from the horizontal non-linear processing means 2Ah as image D2Ah.

Figure 7:
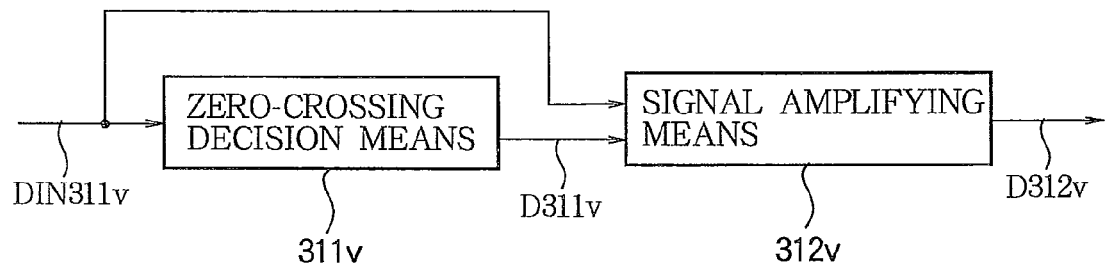
FIG. 7 is a block diagram illustrating an exemplary structure of the vertical non-linear processing means 2Av in FIG. 3.

FIG. 7 is a diagram illustrating an exemplary structure of the vertical non-linear processing means 2Av. The illustrated vertical non-linear processing means 2Av includes a zero-crossing decision means 311v and a signal amplifying means 312v. Image D1v is input to the vertical non-linear processing means 2Av as an input image DIN311v.

The zero-crossing decision means 311v checks the pixel values in the input image DIN311v for changes in the vertical direction. A point where the pixel value changes from positive to negative or from negative to positive is identified as a zero-crossing point, and the positions of the pixels preceding and following the zero-crossing point (the adjacently preceding and following pixels) are reported to the signal amplifying means 312v by a signal D311v. The zero-crossing decision means 311v in the vertical non-linear processing means 2Av recognizes the pixels above and below the zero-crossing point as the pixels preceding and following the zero-crossing point.

The signal amplifying means 312v identifies the pixels preceding and following the zero-crossing point (the adjacently preceding and following pixels) from signal D311v and generates a non-linear image D312v by amplifying the pixel values (increasing the absolute values) of only the pixels preceding and following the zero-crossing point. The amplification factor for the pixel values of the pixels preceding and following the zero-crossing point is a value greater than 1, and the amplification factor for the pixel values of other pixels is 1.

The non-linear processing means 2A operates as described above.

Next, in the second intermediate image generating means 2, the high-frequency component image generating means 2B generates image D2B by extracting only the high-frequency component of image D2A above the third frequency. The high-frequency component can be extracted by performing high-pass filter processing. The high-frequency component of the image is extracted in the horizontal direction and the vertical direction separately. The high-frequency component image generating means 2B includes a horizontal high-frequency component image generating means 2Bh for generating an image D2Bh by performing horizontal high-pass filter processing on image D2Ah to extract a horizontal high-frequency component above a third horizontal frequency only in the horizontal direction and a vertical high-frequency component image generating means 2Bv for generating an image D2Bv by performing vertical high-pass filter processing on image D2Av to extract a vertical high-frequency component above a third vertical frequency only in the vertical direction; image D2B includes image D2Bh and image D2Bv. Image D2B is output from the second intermediate image generating means 2 as intermediate image D2. Intermediate image D2 includes an image D2h corresponding to image D2Bh and an image D2v corresponding to image D2Bv.

Next the detailed operation of the first intermediate image processing means 3M will be described.

Intermediate image processing means 3M performs a process for suppressing low-level noise (a low-level noise suppression process) on the first intermediate image D1. Since the first intermediate image includes image D1h and image D1v, the horizontal low-level noise suppression means 3Mh performs a low-level noise suppression process on image D1h to generate an image D3Mh, and the vertical low-level noise suppression means 3Mv performs a low-level noise suppression process on image D1v to generate an image D3Mv. Image D3Mh and image D3Mv are output from the first intermediate image processing means 3M as intermediate image D3M.

The low-level noise suppression process will now be described in further detail with reference to FIGS. 8(A) and 8(B).

Figure 8A:
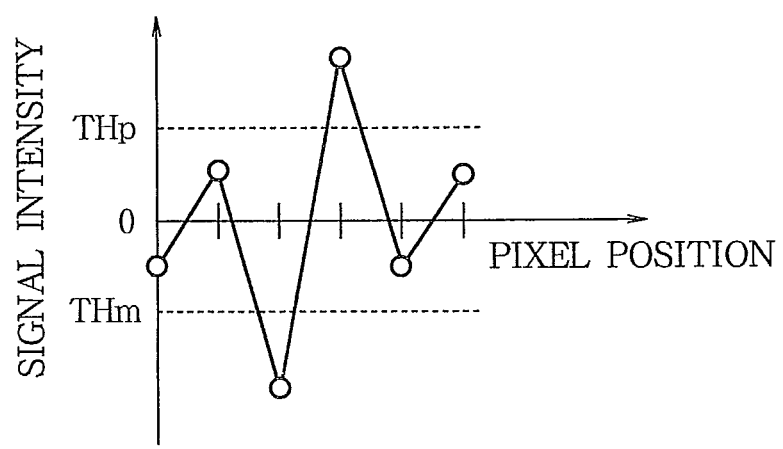
FIGS. 8(A) and 8(B) are diagrams showing the signal input to a coring process and the signal output from the coring process.
Figure 8B:
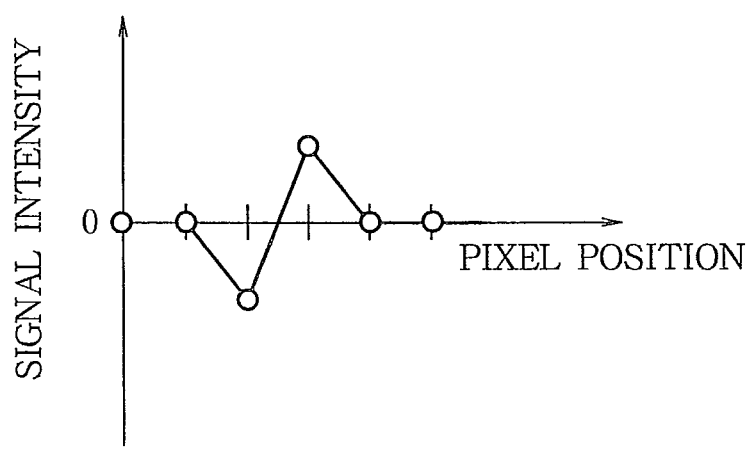

In FIGS. 8(A) and 8(B), a coring process is used as an exemplary low-level noise suppression process. FIG. 8(A) illustrates an input signal input to the coring process; FIG. 8(B) illustrates an output signal output by the coring process. If the input value to the coring process is DATAIN and the output value from the coring process is DATAOUT, the relationship between DATAIN and DATAOUT is given by:

[Mathematical expression 1]

$$DATAOUT = \begin{cases} DATAIN - THp & \text{if } (DATAIN \geq THp) \\ 0 & \text{if } (THp > DATAIN > THm) \\ DATAIN + THm & \text{if } (THm \geq DATAIN) \end{cases} \quad (1)$$

THp denotes a threshold value that takes a positive value; THm denotes a threshold value that takes a negative value.

A comparison of FIGS. 8(A) and 8(B) shows that low-level noise (oscillation in the range from threshold value THp to threshold value THm) is clearly being suppressed by the coring process. That is, low-level noise can be suppressed by the coring process.

The low-level noise suppression process is not limited to the coring process described by Expression (1); any process that can suppress low-level noise may be used.

The first intermediate image processing means 3M operates as described above.

Next the operation of the second intermediate image processing means 3H will be described. A comparison of FIGS. 4 and 5 indicates that the second intermediate image processing means has the same structure as the first intermediate image processing means except that the input signal is intermediate image D2; the intermediate image D3H output by the second intermediate image processing means 3H is obtained by performing, on intermediate image D2, the same processing as performed on intermediate image D1 by the first intermediate image processing means 3M. Since the details of the operation of the second intermediate image processing means 3H are clear from the detailed description of the operation of the first intermediate image processing means 3M given above, a description of the detailed operation of the second intermediate image processing means 3H will be omitted.

Finally, the operation of the adding means 4 will be described. The adding means 4 generates an output image DOUT by adding the input image DIN, intermediate image D3M, and intermediate image D3H together. The output image DOUT of the adding means 4 is output from the image processing apparatus as the final output image.

Intermediate image D3M includes image D3Mh and image D3Mv, and intermediate image D3H includes image D3Hh and image D3Hv, so to add the input image DIN, intermediate image D3M, and intermediate image D3H together means to add images D3Mh, D3Mv, D3Hh, and D3Hv to the input image DIN.

The addition in the adding means 4 is not limited to simple addition; weighted addition may be performed. That is, images D3Mh, D3Mv, D3Hh, and D3Hv may be amplified by different amplification factors before being added to the input image DIN.

An example in which the image processing apparatus in this embodiment is utilized as part of an image display apparatus will be described below. The description will clarify the effects of the image processing apparatus in this embodiment. Unless otherwise specified, Fn will denote the Nyquist frequency of the input image DIN.

FIG. 9 illustrates an image display apparatus utilizing the image processing apparatus according to the invention; in the illustrated image display apparatus, an image corresponding to the original image DORG is displayed on a monitor U3.

If the image size of the original image DORG is smaller than the image size of the monitor U3, the image enlarging means U1 outputs an image DU1 obtained by enlarging the original image DORG. The image can be enlarged by the bicubic method, for example.

The image processing apparatus U2 of this invention outputs an image DU2 obtained by performing the processing described above on image DU1. Image DU2 is displayed on the monitor U3.

The operation and effects of the image enlarging means U1 will be described below on the assumption that the number of pixels in the original image DORG is half of the number of pixels in the monitor U3 in both the horizontal and vertical directions.

FIG. 10 is a diagram illustrating the structure and operation of the image enlarging means U1. The image enlarging means U1 includes a horizontal zero insertion means U1A, a horizontal low-frequency component passing means U1B, a vertical zero insertion means U1C, and a vertical low-frequency component passing means U1D.

The horizontal zero insertion means U1A generates an image DU1A by appropriately inserting pixels having a pixel value of 0 into the original image DORG in the horizontal direction (inserting a column of pixels having pixel values of 0 between each horizontally adjacent pair of pixel columns in the original image DORG).

The horizontal low-frequency component passing means U1B generates an image DU1B by performing low-pass filter processing to extract only a low-frequency component from image DU1A.

The vertical zero insertion means U1C generates an image DU1C by appropriately inserting pixels having a pixel value of 0 into image DU1B in the vertical direction (inserting a row of pixels having pixel values of 0 between each vertically adjacent pair of pixel rows in image DU1B).

The vertical low-frequency component passing means U1D generates an image DU1D by extracting only a low-frequency component from image DU1C.

Image DU1D, which is output from the image enlarging means U1 as image DU1, is an enlargement of the original image DORG by a factor of two in both the horizontal direction and the vertical direction.

FIGS. 11(A) to 11(E) are diagrams illustrating the operation of the image enlarging means U1 in detail: FIG. 11(A) shows the original image DORG; FIG. 11(B) shows image DU1A; FIG. 11(C) shows image DU1B; FIG. 11(D) shows image DU1C; FIG. 11(E) shows image DU1D. In FIGS. 11(A) to 11(E), each box represents a pixel, and the characters or numbers in the box represent the pixel value of the corresponding pixel.

The horizontal zero insertion means U1A generates the image DU1A shown in FIG. 11(B) by inserting a pixel having a pixel value of 0 for each pixel in the original image DORG shown in FIG. 11(A) in the horizontal direction (inserting a column of pixels having pixel values of 0 between each horizontally adjacent pair of pixel columns in the original image DORG). The horizontal low-frequency component passing means U1B generates the image DU1B shown in FIG. 11(C) by performing low-pass filter processing on the image DU1A shown in FIG. 11(B).

The vertical zero insertion means U1C generates the image DU1C shown in FIG. 11(D) by inserting a pixel having a pixel value of 0 for each pixel in the image DU1B shown in FIG. 11(C) in the vertical direction (inserting a row of pixels having pixel values of 0 between each vertically adjacent pair of pixel rows in image DU1B). The vertical low-frequency component passing means U1D generates the image DU1D shown in FIG. 11(E) by performing low-pass filter processing on the image DU1C shown in FIG. 11(D). The image DU1D generated by this processing is twice as large as the original image DORG in both the horizontal and vertical directions.

Figure 12:
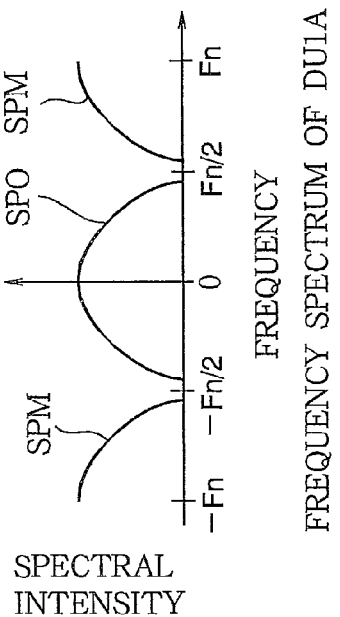
FIGS. 12(A) to 12(D) are diagrams showing frequency spectra and a frequency response to illustrate the operation of the image enlarging means U1 in FIG. 10.
Figure 12:
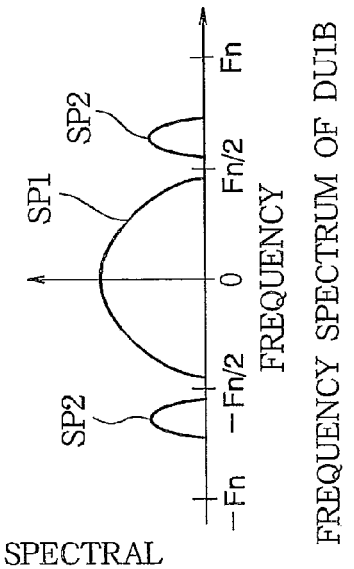
Figure 12:
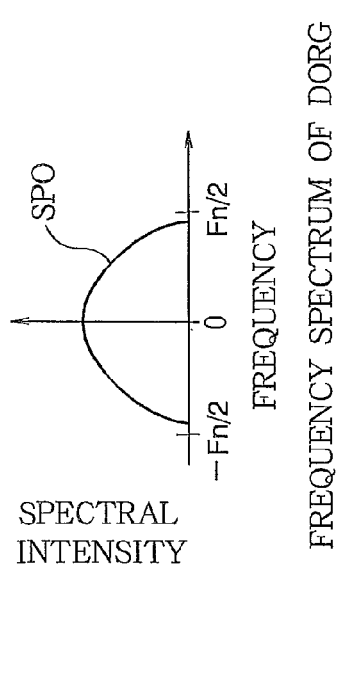
Figure 12:
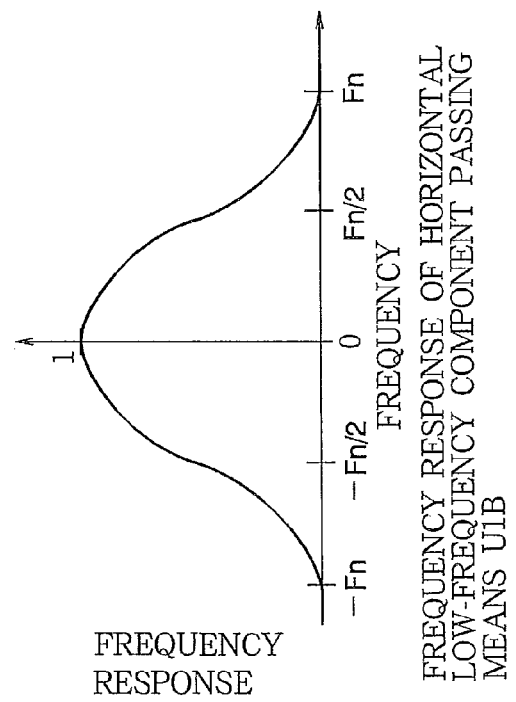

FIGS. 12(A) to 12(D) represent the effect of processing by the image enlarging means U1 in the frequency domain: FIG. 12(A) represents the frequency spectrum of the original image DORG; FIG. 12(B) represents the frequency spectrum of image DU1A; FIG. 12(C) represents the frequency response of the horizontal low-frequency component passing means U1B; FIG. 12(D) represents the frequency spectrum of image DU1B. In FIGS. 12(A) to 12(D), the horizontal axis is a frequency axis representing spatial frequency in the horizontal direction, and the vertical axis represents the intensity value of the frequency spectrum or frequency response.

The number of pixels in the original image DORG is half the number of pixels in the input image DIN; in other words, the sampling interval of the original image DORG is twice the sampling interval of the input image DIN. Consequently, the Nyquist frequency of the original image DORG is half the Nyquist frequency of the input image DIN, i.e., Fn/2.

For the sake of simplicity, a single frequency axis is used in FIGS. 12(A) to 12(D). Image data in general, however, assign pixel values to pixels arranged in a two-dimensional array, and their frequency spectra are described in a plane determined by a horizontal frequency axis and a vertical frequency axis. Accordingly, both the horizontal frequency axis and the vertical frequency axis should be indicated to represent the frequency spectra of images such as DORG accurately. Since frequency spectra are generally isotropic about the origin of the frequency axes, if a frequency spectrum is given in a space with a single frequency axis, those skilled in the art can easily imagine how the frequency spectrum appears in a space with two frequency axes. Therefore, unless otherwise specified, spaces with a single frequency axis will be used in the descriptions related to the frequency domain.

First the frequency spectrum of the original image DORG will be described. The image input as the original image DORG is generally a natural image, in which case its spectral intensity is concentrated around the origin of the frequency space. The frequency spectrum of the original image DORG is accordingly like spectrum SP0 in FIG. 12(A).

Next the spectral intensity of image DU1A will be described. Image DU1A is generated by inserting a pixel having a pixel value of 0 for each pixel in the original image DORG in the horizontal direction. This processing causes the frequency spectrum to fold over at the Nyquist frequency of the original image DORG. Because a spectrum SPM is generated by fold-over of the spectrum SP0 at frequencies of ±Fn/2, the frequency spectrum of image DU1A is represented as shown in FIG. 12(B).

Next the frequency response of the horizontal low-frequency component passing means U1B will be described. The horizontal low-frequency component passing means is implemented by a low-pass filter, and its frequency response decreases as the frequency increases, as shown in FIG. 12(C).

Finally, the frequency spectrum of image DU1B will be described. The image DU1B shown in FIG. 12(D) is obtained by performing low-pass filter processing, with the frequency response shown in FIG. 12(C), on the image DU1A having the frequency spectrum shown in FIG. 12(B).

As shown in image DU1B, the frequency spectrum of image DU1B includes a spectrum SP2 having a somewhat lower intensity than spectrum SPM and a spectrum SP1 having a somewhat lower intensity than spectrum SP0. The frequency response of a low-pass filter generally decreases as the frequency increases. In comparison with spectrum SP0, spectrum SP1 accordingly has an intensity lowered by the horizontal low-frequency component passing means U1B on the high-frequency side, at frequencies near ±Fn/2.

Among the processing by the image enlarging means U1, the effects in the frequency domain of the processing performed by the vertical zero insertion means U1C and the vertical low-frequency component passing means U1D will not be described, but from the content of the processing it can be easily understood that the effects are the same as described with reference to FIGS. 12(A) to 12(D), though in the direction of the vertical spatial frequency axis. The frequency spectrum of image DU1D becomes a two-dimensional expansion of the frequency spectrum shown in FIG. 12(D).

In the subsequent description, spectrum SP2 will be referred to as the fold-over component. The fold-over component appears on an image as a spurious signal or noise having relatively high-frequency components. This type of noise or spurious signal includes overshoot, jaggies, ringing, and the like.

The effects of the image processing apparatus according to the invention will now be described.

Figure 13D:
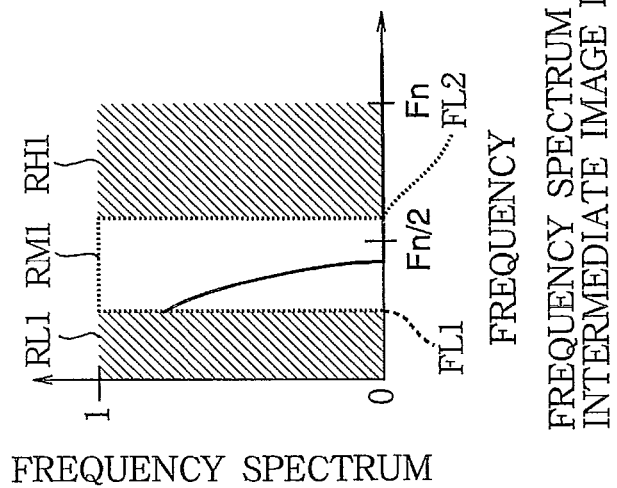
Figure 13E:
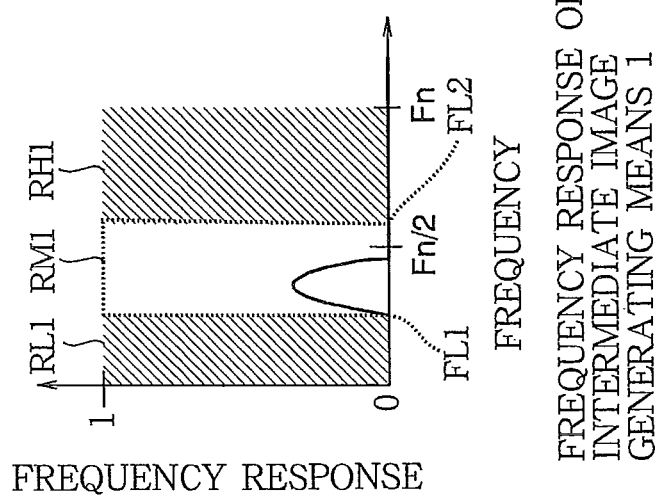

FIGS. 13(A) to 13(E) are diagrams schematically representing the effect of generating intermediate image D1 from the input image DIN when an image DU1D obtained by enlarging the original image DORG is input as the input image DIN (or image DU1): FIG. 13(A) represents the frequency spectrum of the input image DIN; FIG. 13(B) represents the frequency response of the high-frequency component image generating means 1A; FIG. 13(C) represents the frequency response of the low-frequency component image generating means 1B; FIG. 13(D) represents the frequency response of the first intermediate image generating means 1; FIG. 13(E) represents the frequency spectrum of intermediate image D1. FIGS. 13(A) to 13(E) use just a single frequency axis, for the same reason as in FIGS. 12(A) to 12(D).

In FIGS. 13(A) to 13(E), the intensity value of the frequency spectrum or frequency response is shown only in the range where the spatial frequency is zero or greater, but the frequency spectrum or frequency response described below is symmetrical about the origin on the frequency axis. Therefore, the diagrams used in the description, showing only the range in which the spatial frequency is zero or greater, are sufficient.

First the frequency spectrum of the input image DIN will be described. Because an image DU1D generated by enlargement processing in the image enlarging means U1 is input as the input image DIN, the frequency spectrum of the input image DIN, shown in FIG. 13(A), has the same shape as shown in FIG. 12(D), including a spectrum SP1 which has a lower intensity than the spectrum SPO of the original image DORG and a spectrum SP2, which is a fold-over component.

Next the frequency response of the high-frequency component image generating means 1A will be described. Since the high-frequency component image generating means 1A is implemented by a high-pass filter, its frequency response decreases as the frequency decreases, as shown in FIG. 13(B).

Next the frequency response of the low-frequency component image generating means 1B will be described. Since the low-frequency component image generating means 1B is implemented by a low-pass filter, its frequency response decreases as the frequency increases, as shown in FIG. 13(C).

Next the frequency response of the first intermediate image generating means 1 will be described. Among the frequency components of the input image DIN, the frequency components in a low-frequency region RL1 (the frequency band lower than the first frequency FL1) shown in FIG. 13(D) are weakened by the high-frequency component image generating means 1A in the first intermediate image generating means 1. The frequency components in a high-frequency region RH1 (the frequency band higher than the second frequency FL2) shown in FIG. 13(D) are weakened by the low-frequency component image generating means 1B in the first intermediate image generating means 1. Therefore, as shown in FIG. 13(D), the frequency response of the first intermediate image generating means 1 has a peak in an intermediate region (specific frequency band) RM1 limited by the low-frequency region RL1 and the high-frequency region RH1.

Next the frequency spectrum of intermediate image D1 will be described. The intermediate image D1 shown in FIG. 13(E) is obtained by passing the input image DIN having the frequency spectrum shown in FIG. 13(A) through the first intermediate image generating means 1 having the frequency response shown in FIG. 13(D). Since the frequency response of the first intermediate image generating means 1 peaks in the intermediate region RM1 limited by the low-frequency region RL1 and the high-frequency region RH1, the frequency spectrum of intermediate image D1 is the frequency spectrum of the input image DIN with attenuation of the parts included in the low-frequency region RL1 and high-frequency region RH1. Therefore, spectrum SP2, which would become a fold-over component, is removed from the high-frequency component of input image DIN in intermediate image D1. In other words, the first intermediate image generating means 1 has the effect of generating intermediate image D1 by removing spectrum SP1, which becomes a fold-over component, from the high-frequency component of the input image DIN.

Figure 14:
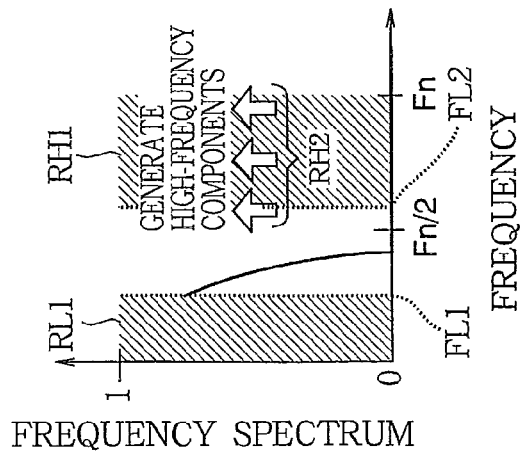
FIGS. 14(A) to 14(C) are diagrams showing frequency spectra and a frequency response to illustrate the operation of the second intermediate image generating means 2 in FIG. 1.
Figure 14:
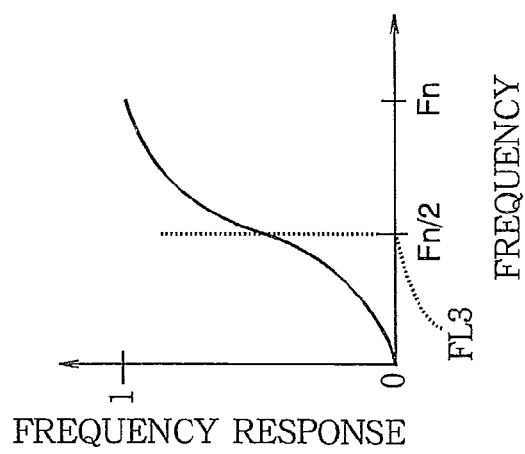
Figure 14:
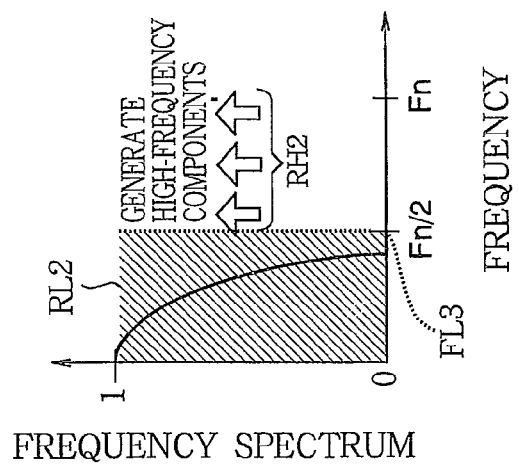

FIGS. 14(A) to 14(C) are diagrams representing the effect of the second intermediate image generating means 2: FIG. 14(A) represents the frequency spectrum of non-linearly processed image D2A; FIG. 14(B) represents the frequency response of the high-frequency component image generating means 2B; FIG. 14(C) represents the frequency spectrum of image D2B. FIGS. 14(A) to 14(C) represent the frequency spectra and frequency response only in regions where the spatial frequency is 0 or greater, for the same reason as FIGS. 13(A) to 13(E).

A high-frequency component corresponding to the high-frequency region RH2 is generated in non-linearly processed image D2A, as described later. FIG. 14(A) expresses this schematically. The image D2B shown in FIG. 14(C) is generated by passing the non-linearly processed image D2A through the high-frequency component image generating means 2B. The high-frequency component image generating means 2B includes a high-pass filter that passes components higher than the third frequency FL3, and its frequency response increases as the frequency increases as shown in FIG. 14(B). Accordingly, the frequency spectrum of image D2B is obtained by removing a component corresponding to the low-frequency region RL2 (the frequency component lower than the third frequency FL3) from the frequency spectrum of the non-linearly processed image D2A, as shown in FIG. 14(C). In other words, the non-linear processing means 2A has the effect of generating a high-frequency component corresponding to the high-frequency region RH2, and the high-frequency component image generating means 2B has the effect of extracting only the high-frequency component generated by the non-linear processing means 2A. In the illustrated example, the third frequency FL3 is substantially equal to Fn/2.

The effects will now be described in further detail.

FIGS. 15(A) to 15(C) and FIGS. 16(A) to 16(C) are diagrams illustrating signals obtained when a step edge is sampled.

Figure 15A:
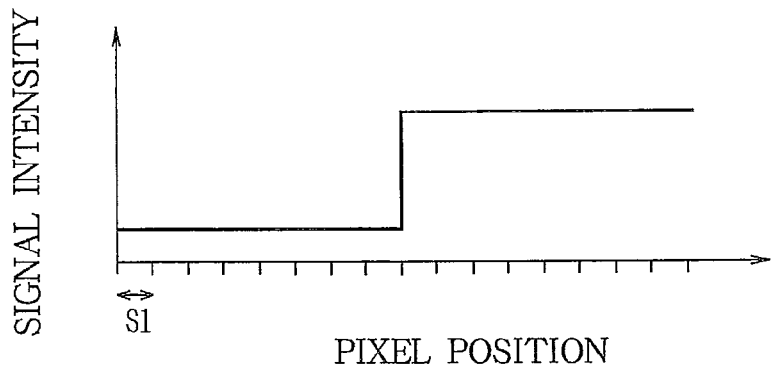
FIGS. 15(A) to 15(C) are diagrams illustrating a step edge and indicating values of consecutive pixel signals obtained when the step edge is sampled at a sampling interval S1.
Figure 15B:
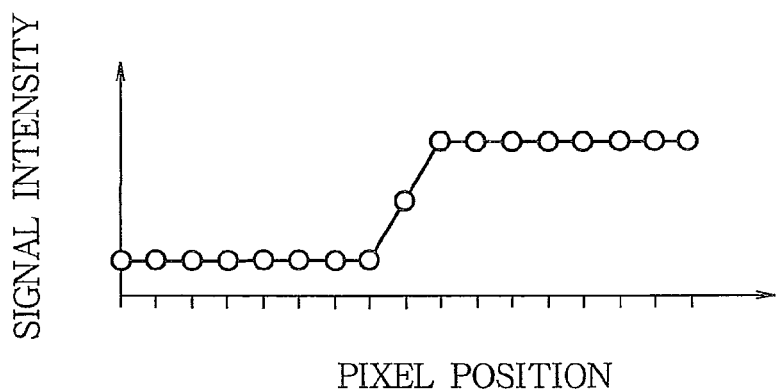
Figure 15C:
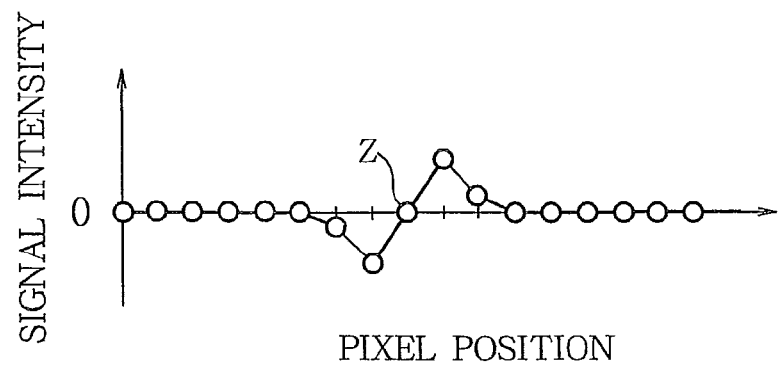
Figure 16A:
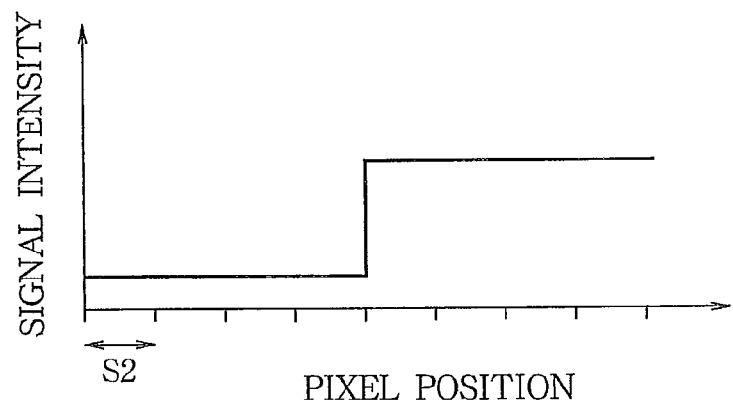
FIGS. 16(A) to 16(C) are diagrams illustrating a step edge and indicating values of consecutive pixel signals obtained when the step edge is sampled at a sampling interval S2.
Figure 16B:
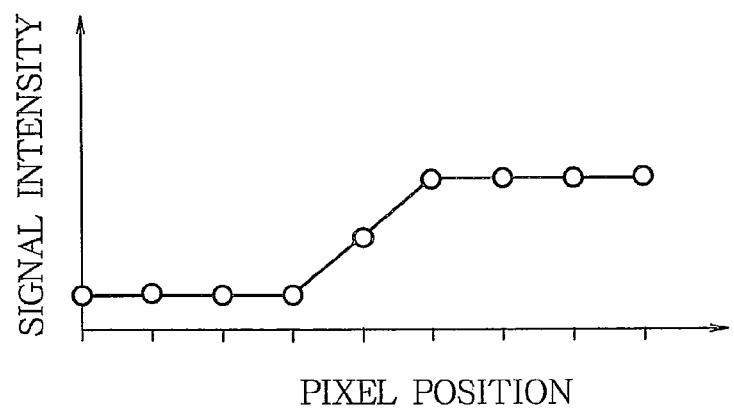
Figure 16C:
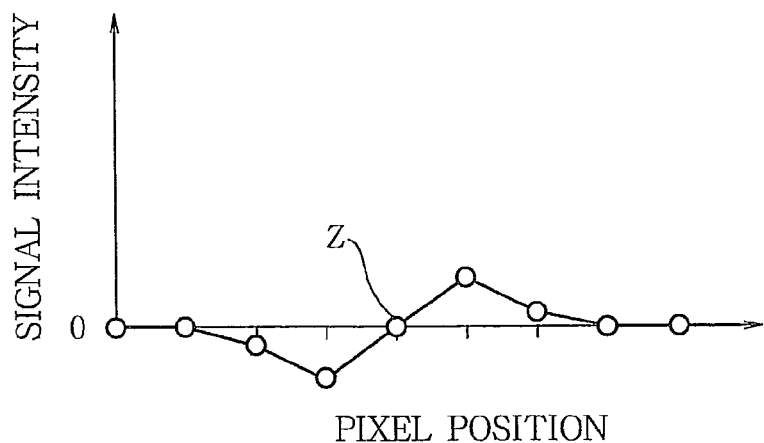

FIG. 15(A) shows a step edge and a sampling interval S1; FIG. 15(B) shows the signal obtained when the step edge is sampled at sampling interval S1; FIG. 15(C) shows the high-frequency component of the signal shown in FIG. 15(B). FIG. 16(A) shows a step edge and a sampling interval S2, which is longer than sampling interval S1; FIG. 16(B) shows the signal obtained when the step edge is sampled at sampling interval S2; FIG. 16(C) shows the high-frequency component of the signal shown in FIG. 16(B). In the description below, the length of sampling interval S2 is twice the length of sampling interval S1.

As shown in FIGS. 15(C) and 16(C), the center of the step edge appears as a zero-crossing point Z in the signal representing the high-frequency component. The slope of the signal representing the high-frequency component near the zero-crossing point Z increases as the length of the sampling interval decreases, and the positions of the points that give the local maximum and local minimum values near the zero-crossing point Z approach the zero-crossing point Z as the length of the sampling interval decreases.

That is, a change in sampling interval does not change the position of the zero-crossing point in the signal representing the high-frequency component near the edge, but as the sampling interval decreases (or the resolution increases), the slope of the high-frequency component near the edge increases, and the position of the points that give the local maximum and minimum values approach the zero-crossing point.

FIGS. 17(A) to 17(F) are diagrams illustrating effects when the signal obtained by sampling the step edge at sampling interval S2 is enlarged to twice its size and then input to the image processing apparatus in this invention, and more specifically the effects of the first intermediate image generating means 1 and second intermediate image generating means 2. As described earlier, the processing in the first intermediate image generating means 1 and second intermediate image generating means 2 is performed in the horizontal direction and the vertical direction separately, and the processing is carried out one-dimensionally. Accordingly, in FIGS. 17(A) to 17(F), the content of the processing is represented by using a one-dimensional signal.

Figure 17A:
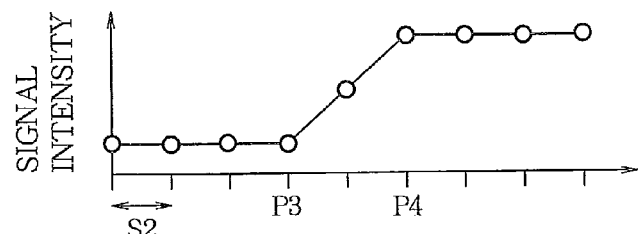
FIGS. 17(A) to 17(F) are diagrams indicating values of consecutive pixel signals to illustrate the operation of the first intermediate image generating means 1 and second intermediate image generating means 2 in FIG. 1.
Figure 17B:
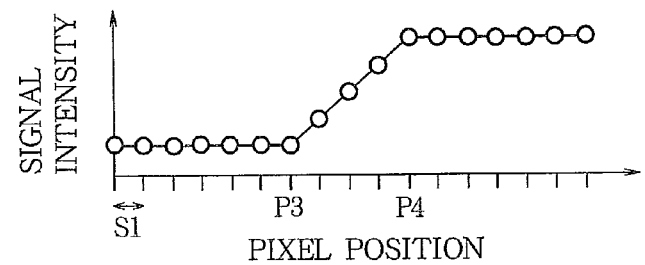

Like FIG. 16(B), FIG. 17(A) shows the signal obtained when the step edge is sampled at sampling interval S2. FIG. 17(B) shows a signal obtained by twofold enlargement of the signal shown in FIG. 17(A). If the original image DORG contains an edge like the one shown in FIG. 17(A), a signal like the one shown in FIG. 17(B) is input as the input image DIN. When the signal is enlarged twofold, the sampling interval becomes half of what it was before the enlargement, so the sampling interval of the signal shown in FIG. 17(B) is the same as sampling interval S1 in FIGS. 14(A) to 14(C). In FIG. 17(A), the position denoted by coordinate P3 is on the boundary of the low luminance region (low level side) of the edge signal, and the position denoted by coordinate P4 is on the boundary of the high luminance region (high level side) of the edge signal.

Figure 17C:
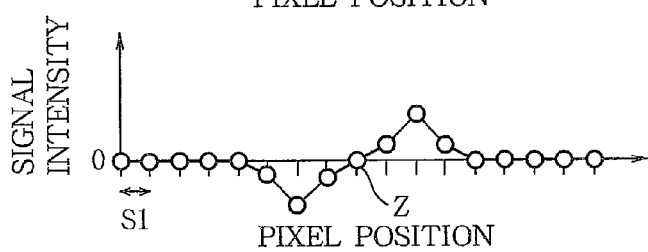

FIG. 17(C) shows a signal representing the high-frequency component of the signal shown in FIG. 17(B), that is, a signal corresponding to the image D1A output from the high-frequency component image generating means 1A. Since image D1A is obtained by extracting the high-frequency component of the input image DIN, it also includes a fold-over component.

Figure 17D:
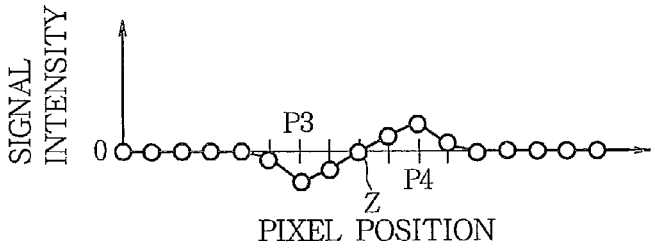

FIG. 17(D) shows a signal representing the low-frequency component of the signal shown in FIG. 17(C), that is, a signal corresponding to the image D1B output from the low-frequency component image generating means 1B. Since, as described earlier, image D1B is output as intermediate image D1, FIG. 17(D) also corresponds to intermediate image D1. In the vicinity of the zero-crossing point Z in intermediate image D1, a local minimum value appears at coordinate P3, and a local maximum value appears at coordinate P4, as shown in FIG. 17(D), matching the form of the high-frequency component extracted from the signal obtained by sampling the step edge at sampling interval S2 as shown in FIG. 16(C). The fold-over component is removed from image D1A by the low-pass filtering process performed by the low-frequency component image generating means 1B.

Figure 17E:
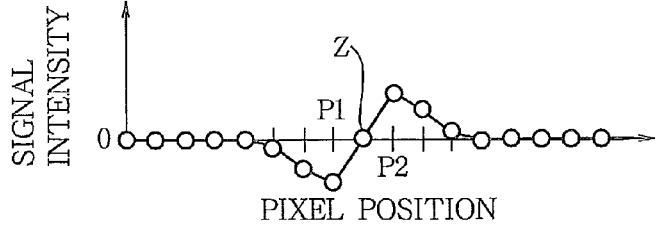

FIG. 17(E) shows the signal output when the signal shown in FIG. 17(D) is input to the non-linear processing means 2A, that is, it illustrates the image D2A output from the non-linear processing means 2A when intermediate image D1 is input. In the non-linear processing means 2A, the signal values at the coordinates P1 and P2 preceding and following (adjacently preceding and following) the zero-crossing point are amplified. Therefore, the magnitudes of the signal values at coordinates P1 and P2 in image D2A become greater than the other values, as shown in FIG. 17(E); the position where the local minimum value appears near the zero-crossing point Z changes from coordinate P3 to coordinate P1, which is closer to the zero-crossing point Z; and the position where the local maximum value appears changes from coordinate P4 to coordinate P2, which is closer to the zero-crossing point Z. This means that the high-frequency component is generated by a non-linear process that amplifies the values of the pixels preceding and following the zero-crossing point Z in the non-linear processing means 2A. A high-frequency component can be generated in this way by changing the amplification factor appropriately for each pixel or by changing the content of the processing appropriately for each pixel. The non-linear processing means 2A has the effect of generating a high-frequency component which is not included in intermediate image D1, that is, a high-frequency component corresponding to the high-frequency region RH2 shown in FIG. 14(A).

Figure 17F:
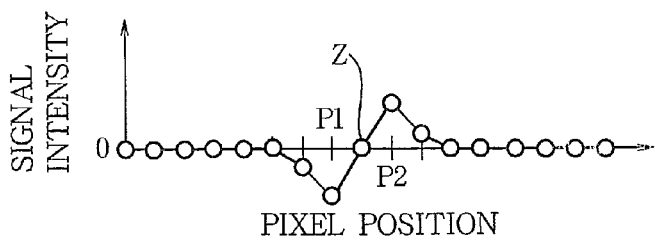

FIG. 17(F) shows a signal representing the high-frequency component of the signal shown in FIG. 17(E), that is, a signal corresponding to the image D2B output from the high-frequency component image generating means 2B. The more precise form of image D2B will be described later, but in the vicinity of the zero-crossing point Z in image D2B, the local minimum value (negative peak) appears at coordinate P1 and the local maximum value (positive peak) appears at coordinate P2, as shown in FIG. 17(F), matching the form of the high-frequency component extracted from the signal obtained by sampling the step edge at sampling interval S1, shown in FIG. 15(C). This means that the high-frequency component generated in the non-linear processing means 2A is extracted by the high-frequency component image generating means 2B and output as image D2B.

It could also be said that the extracted image D2B is a signal including a frequency component corresponding to the sampling interval S1. In other words, the high-frequency component image generating means 2B has the effect of extracting only the high-frequency component generated by the non-linear processing means 2A.

To put it another way, shifting the positions of the peaks in the vicinity of the zero-crossing point Z to the positions represented by coordinates P1 and P2 by performing the process described above is equivalent to generating a frequency component corresponding to the sampling interval S1.

The above-described effects of the second intermediate image generating means 2 can be summarized as follows: the non-linear processing means 2A in the second intermediate image generating means 2 has the effect of generating the high-frequency component corresponding to the high-frequency region RH2; the high-frequency component image generating means 2B in the second intermediate image generating means 2 has the effect of extracting only the high-frequency component generated by the non-linear processing means 2A. Since image D2B is output as intermediate image D2, the second intermediate image generating means 2 can output an intermediate image D2 having a high-frequency component corresponding to sampling interval S1.

Image enhancement processing could be carried out at this point by adding intermediate image D1 and intermediate image D2 to the input image DIN.

Although this invention does not add the first intermediate image D1 and second intermediate image D2 to the input image DIN, the effects that would be obtained by adding the first and second intermediate images will be described below; then the effects of adding the third intermediate image D3M and fourth intermediate image D3H instead of the first intermediate image D1 and second intermediate image D2 will be described.

First, the effect of adding intermediate image D1 will be described. As described earlier, intermediate image D1 is obtained by excluding the fold-over component from the high-frequency component of the input image DIN, and corresponds to the high-frequency component near the Nyquist frequency of the original image DORG, as shown in FIG. 13(E). The spectral intensity near the Nyquist frequency of the original image DORG is weakened by the enlargement processing in the image enlarging means U1, as described with reference to FIG. 12(D). The spectral intensity weakened by the enlargement processing can be made up for by adding intermediate image D1. Since the fold-over component has been excluded from intermediate image D1, spurious signals such as overshoot, jaggies, and ringing are not enhanced.

Next the effect of adding intermediate image D2 will be described. As described above, intermediate image D2 is the high-frequency component corresponding to sampling interval S1. Adding intermediate image D2 can supply a high-frequency component in the band above the Nyquist frequency of the original image DORG, so the perceived image resolution can be increased.

To summarize, by adding intermediate image D1 and intermediate image D2 to the input image DIN, high-frequency components can be added without enhancing the fold-over component, and the perceived image resolution can be improved.

The addition of high-frequency components generated as described above to the input image can sharpen the image and can improve its image quality, but if the input image includes much noise, the noise is enhanced and the image quality may be lowered instead.

FIGS. 18(A) to 18(E) are diagrams illustrating the lowering of image quality by the addition of high-frequency components.

Figure 18A:
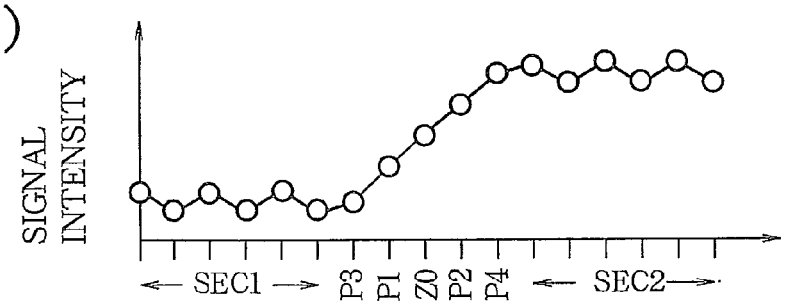
FIGS. 18(A) to 18(E) are diagrams indicating values of consecutive pixel signals to illustrate the operation of the first intermediate image generating means 1 and second intermediate image generating means 2.

FIG. 18(A), like FIG. 17(B), shows an image enlarged twofold after a step-edge signal is sampled. Unlike FIG. 17(B), however, FIG. 18(A) has noise in the intervals denoted by SEC1 and SEC2. Coordinate Z0 represents the central part of the step edge signal. A case in which the image shown in FIG. 18(A) is input as input image DIN will be considered below.

For convenience, FIG. 18(A) depicts low-level noise (two-pixel cyclic low-level noise), which alternately increases and decreases at each pixel as noise in the intervals SEC1 and SEC2, but the noise is not limited to this form. That is, the low-level noise period is not limited to two pixels, or to one specific form. In other words, it may be a combination of a plurality of frequencies. An exemplary combinatorial noise form including all frequencies is white noise. The noise is also not limited to periodic noise; it may occur sporadically, as in salt-and-pepper noise.

Figure 18B:
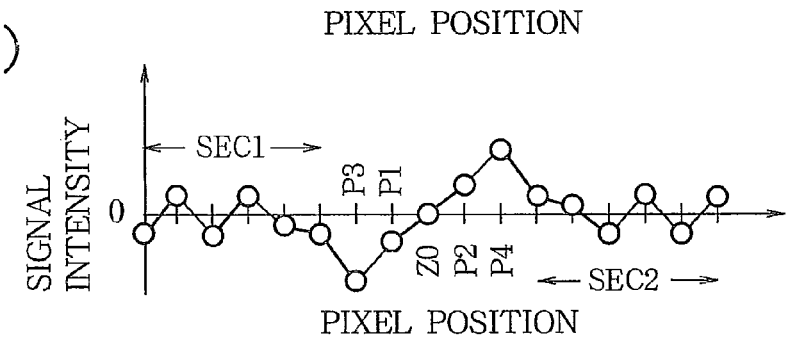

FIG. 18(B) is a diagram showing the image D1A obtained this time. This image D1A has substantially the same form as described with reference to FIG. 17(C), but differs from FIG. 17(C) in that low-level noise is present in intervals SEC1 and SEC2, due to the noise included in intervals SEC1 and SEC2 in the input image. DIN. In other words, low-level noise occurs in intervals SEC1 and SEC2 because part of the noise included in the input image DIN passes through the high-pass filter in the high-frequency component image generating means 1A.

Figure 18C:
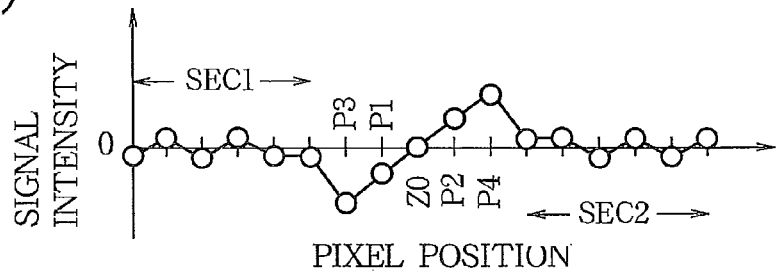

FIG. 18(C) is a diagram illustrating the intermediate image D1 obtained this time. This intermediate image D1A has substantially the same form as described with reference to FIG. 17(D), but differs from FIG. 17(D) in that low-level noise is present in intervals SEC1 and SEC2. This is because part of the low-level noise included in image D1A passes through the low-pass filter in the low-frequency component image generating means 1B.

In other words, image D1 includes the part of the noise included in image D1A that has passed through the frequency band shown as region RM1 in FIG. 13(D).

Figure 18D:
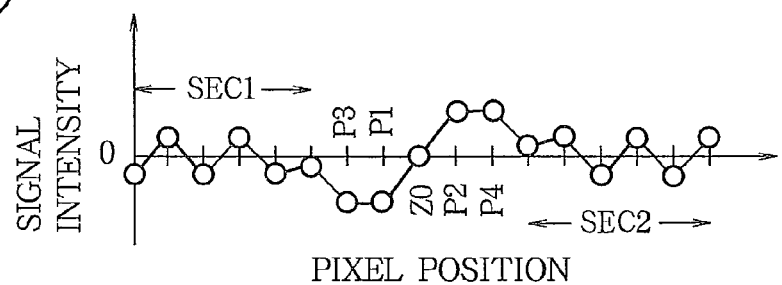

FIG. 18(D) is a diagram illustrating the intermediate image D2A obtained this time. This intermediate image D2A has substantially in the same form as described with reference to FIG. 17(E), but differs from FIG. 17(E) in that low-level noise is present in intervals SEC1 and SEC2. This arises from the low-level noise included in intermediate image D1. Since the low-level noise present in intervals SEC1 and SEC2 in intermediate image D1 includes many zero-crossing points at which the low-level noise value changes from positive to negative or from negative to positive, the low-level noise is amplified by the non-linear processing in the non-linear processing means 2A.

Figure 18E:
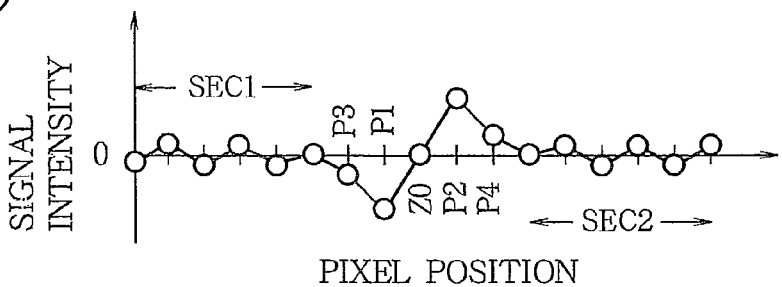

FIG. 18(E) is a drawing illustrating the intermediate image D2 obtained this time. This intermediate image D2 has substantially the same form as described with reference to FIG. 17(F), but differs from FIG. 17(F) in that low-level noise is present in intervals SEC1 and SEC2. This is because part of the low-level noise included in intermediate image D2A passes through the high-pass filter in the high-frequency component image generating means 2B.

The step-edge signal centered on coordinate Z0 can be enhanced by adding the intermediate image D1 shown in FIG. 18(C) and the intermediate image D2 shown in FIG. 18(E) to the input image DIN shown in FIG. 18(A), whereby the perceived image resolution can be improved. In intervals SEC1 and SEC2, however, low-level noise is also added from intermediate image D1 and intermediate image D2, and as a result, the noise originally included in intervals SEC1 and SEC2 is increased.

As described above, noise included in the input image DIN appears as low-level noise in intermediate images D1 and D2. The low-level noise is added to the input image DIN, thereby increasing the noise.

Therefore, to carry out image enhancement processing without increasing noise, the low-level noise present in intermediate images D1 and D2 is suppressed before they are added to the input image DIN.

In the image processing apparatus according to the first embodiment of the invention, the first intermediate image processing means 3M suppresses low-level noise by a low-level noise suppression process in intermediate image D1, and the second intermediate image processing means 3H suppresses low-level noise by a low-level noise suppression process in intermediate image D2.

The effects of the image processing apparatus according to the first embodiment of the invention will now be described with reference to FIGS. 19(A) to 19(D), in which a coring process used as an exemplary low-level noise suppression process.

Figure 19A:
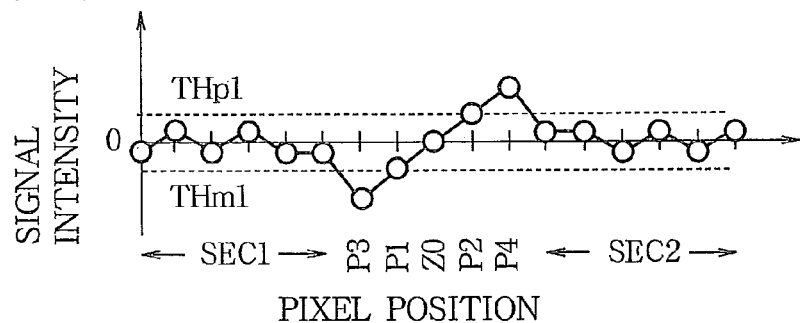
FIGS. 19(A) to 19(D) are diagrams indicating values of consecutive pixel signals to illustrate the operation of the first intermediate image processing means 3M and second intermediate image processing means 3H.

The intermediate image D1 shown in FIG. 18(B) is shown again in FIG. 19(A). FIG. 19(A) also shows the threshold values THp1 and THm1 used for the coring process by the first intermediate image processing means 3M.

Figure 19B:
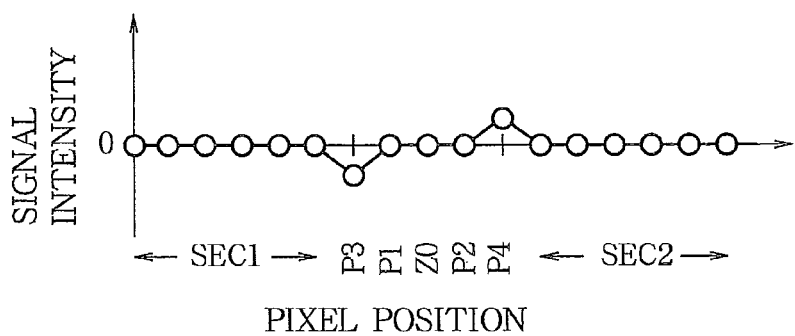

FIG. 19(B) shows the intermediate image D3M generated by the coring process of the first intermediate image processing means 3M. It can be seen that since low-level noise in the range limited by the threshold values THp1 and THm1 is suppressed by the coring process, the low-level noise included in intervals SEC1 and SEC2 has been suppressed. The peaks positioned at coordinates P3 and P4 remain intact, so adding this intermediate image D3M to the input image DIN enables the image enhancement processing to be carried out without increasing noise.

Figure 19C:
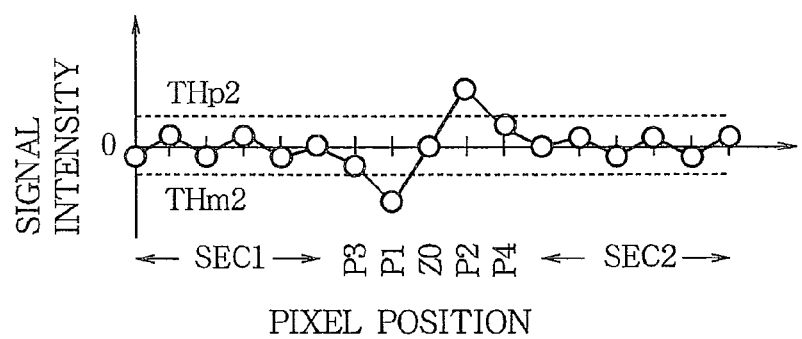

The intermediate image D2 shown in FIG. 18(E) is shown again in FIG. 19(C). FIG. 19(C) also shows the threshold values THp2 and THm2 used for the coring process by the second intermediate image processing means 3H.

Figure 19D:
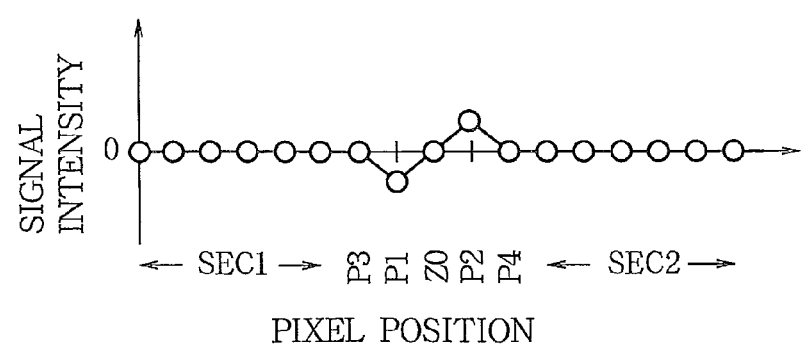

FIG. 19(D) shows the intermediate image D3H generated by the coring process in the second intermediate image processing means 3H. It can be seen that since the low-level noise in the range indicated by the threshold values THp2 and THm2 is suppressed by the coring process, the low-level noise included in intervals SEC1 and SEC2 in intermediate image D2 has been suppressed. The peaks positioned at coordinates P1 and P2 remain intact, so it is also possible to carry out image enhancement processing by adding intermediate image D3H to the input image DIN. As described above, the peaks present at coordinates P1 and P2 in the vicinity of the zero-crossing point are a high-frequency component corresponding to sampling interval S1, so adding intermediate image D3H can supply a high-frequency component in the frequency band above the Nyquist frequency of the original image DORG, increasing the perceived resolution of the image.

As described above, in the image processing apparatus according to the first embodiment of the invention, the perceived image resolution is improved without increasing noise included in the input image DIN.

To summarize, adding intermediate images D3M and D3H to the input image DIN can improve the perceived image resolution without increasing noise.

In the image processing apparatus in the invention, the first intermediate image generating means 1 and the second intermediate image generating means 2 perform image processing in the horizontal direction and the vertical direction in parallel. Accordingly, the effects described above can be obtained not just in the horizontal or vertical direction but in any direction.

Considered in the frequency domain, the image processing apparatus in this invention generates an image D2B corresponding to high-frequency components near the Nyquist frequency ±Fn of the input image DIN on the basis of the components in the input image DIN near half of the Nyquist frequency of the original image DORG, ±Fn/2, (or in a particular frequency band), in a frequency band from the origin to Fn. Even if the frequency components near the Nyquist frequency ±Fn are lost in the input image DIN, frequency components near the Nyquist frequency ±Fn can be supplied by image D2B. In other words, since the input image DIN is given frequency components on the high-frequency side, the perceived image resolution of the output image DOUT can be increased.

The location used as the particular frequency band is not limited to the vicinity of ±Fn/2. The frequency band to be used can be changed by changing the frequency response of the high-frequency component image generating means 1A and low-frequency component image generating means 1B appropriately.

In the description given above, an image enlargement process was given as an exemplary process in which frequency components near the Nyquist frequency Fn are lost, but that is not the only cause of the loss of frequency components near the Nyquist frequency Fn in the input image DIN; noise suppression and various other causes can also be considered. Therefore, the use of the image processing apparatus of the invention is not limited to processing following image enlargement processing.

The low-level noise suppression process carried out in the first intermediate image processing means 3M and the second intermediate image processing means 3H is not limited to the process described in this embodiment; any type of process capable of suppressing low-level noise may be carried out.

Second Embodiment

Figure 20:
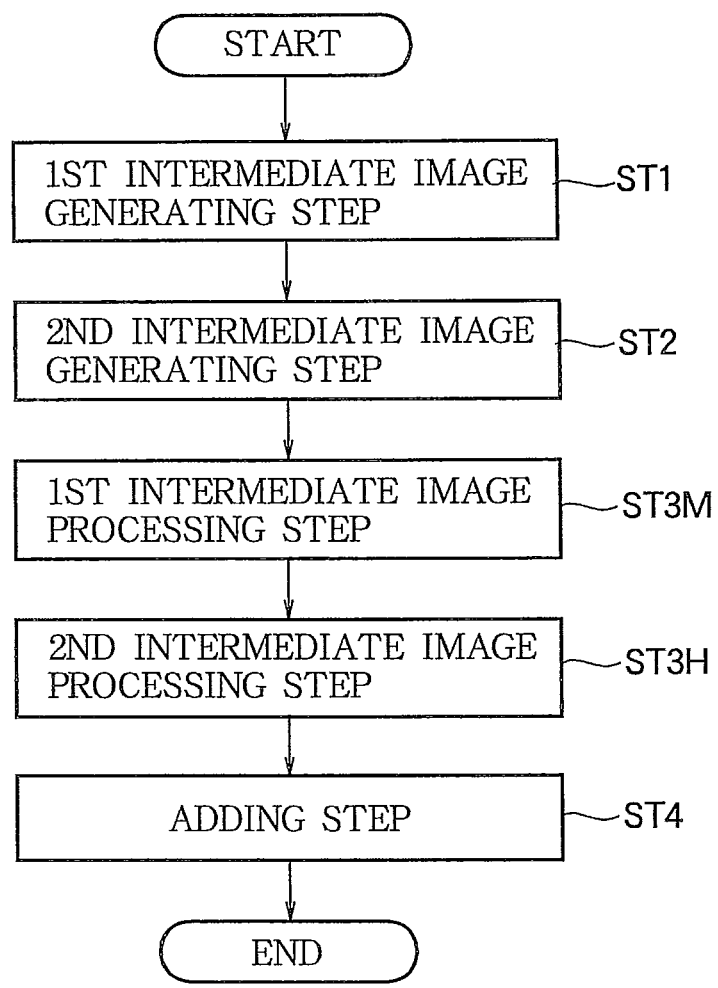
FIG. 20 is a flowchart illustrating processing steps in an image processing method according to a second embodiment.

FIG. 20 is a flowchart illustrating an image processing method according to the second embodiment of the invention; the image processing method according to the second embodiment of the invention includes a first intermediate image generating step ST1, a second intermediate image generating step ST2, a first intermediate image processing step ST3M, a second intermediate image processing step ST3H, and an adding step ST4.

Figure 21:
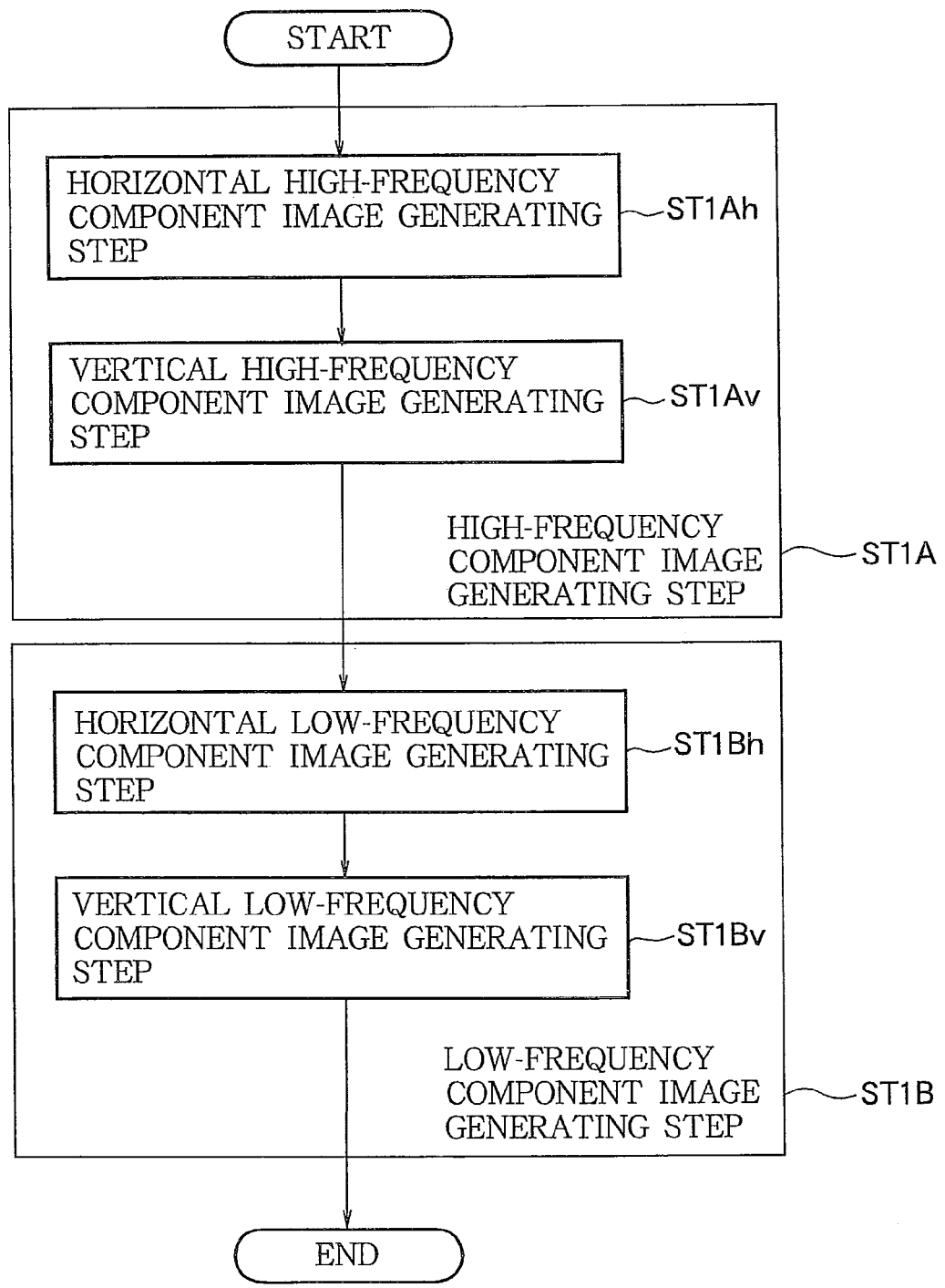
FIG. 21 is a flowchart illustrating processing in the first intermediate image generating step ST1 in FIG. 20.

The first intermediate image generating step ST1 includes, as shown in FIG. 21, a high-frequency component image generating step ST1A and a low-frequency component image generating step ST1B.

The high-frequency component image generating step ST1A includes a horizontal high-frequency component image generating step ST1Ah and a vertical high-frequency component image generating step ST1Av, and the low-frequency component image generating step ST1B includes a horizontal low-frequency component image generating step ST1Bh and a vertical low-frequency component image generating step ST1Bv.

Figure 22:
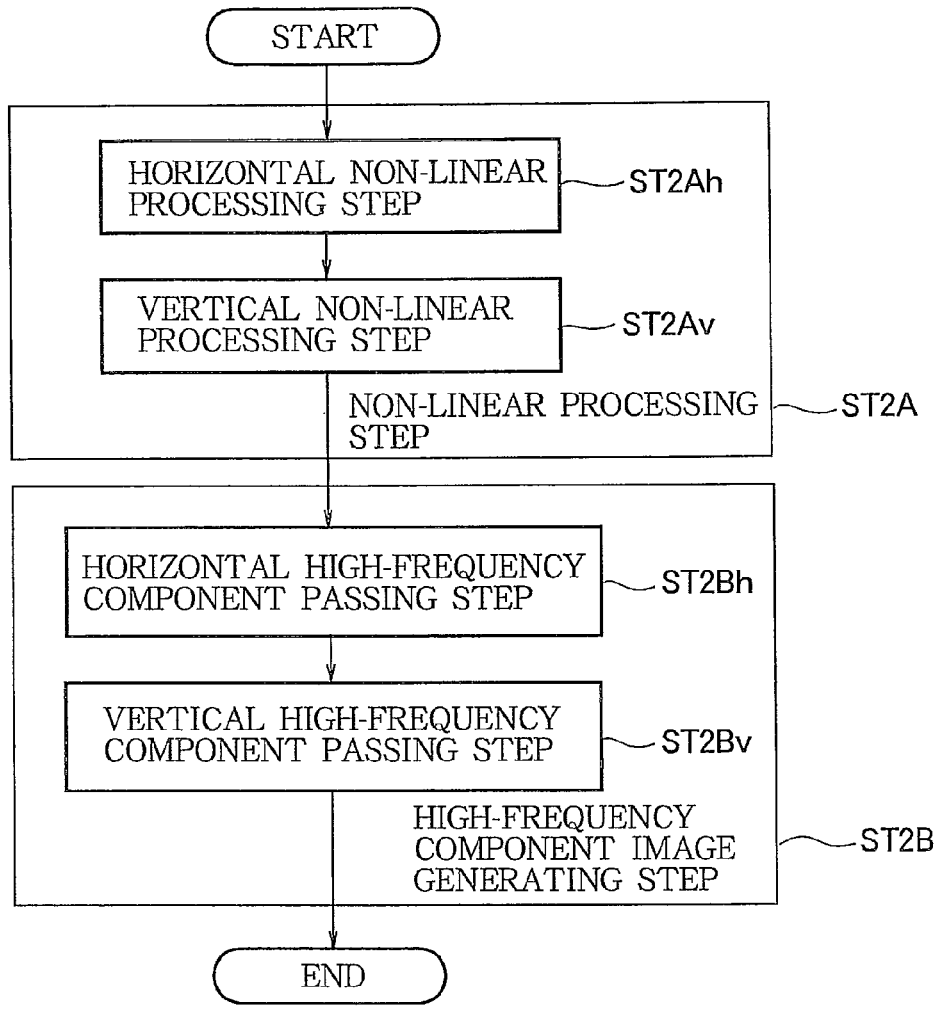
FIG. 22 is a flowchart illustrating processing in the second intermediate image generating step ST2 in FIG. 20.

As illustrated in FIG. 22, the second intermediate image generating step ST2 includes a non-linear processing step ST2A and a high-frequency component image generating step ST2B.

The non-linear processing step ST2A includes a horizontal non-linear processing step ST2Ah and a vertical non-linear processing step ST2Av, and the high-frequency component image generating step ST2B includes a horizontal high-frequency component passing step ST2Bh and a vertical high-frequency component passing step ST2Bv.

Figure 23:
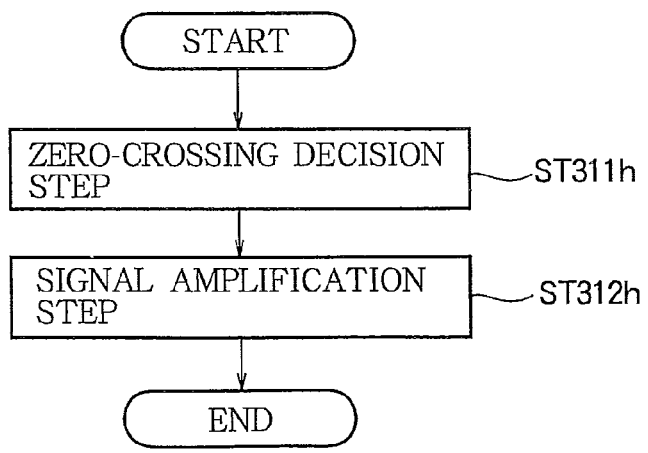
FIG. 23 is a flowchart illustrating processing in the horizontal non-linear processing step ST2Ah in FIG. 22.
Figure 24:
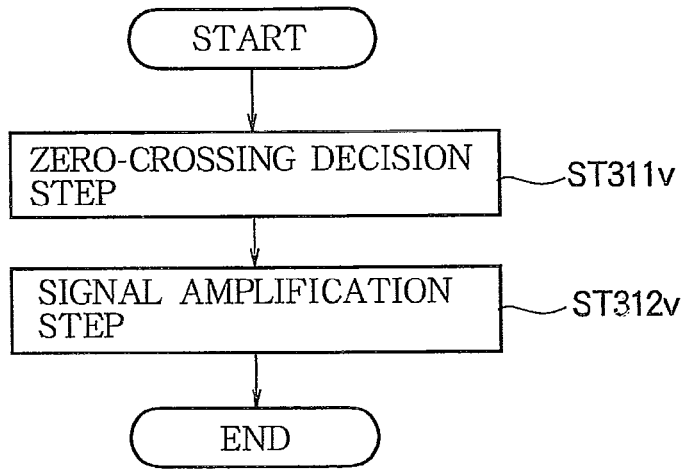
FIG. 24 is a flowchart illustrating processing in the vertical non-linear processing step ST2Av in FIG. 22.

The horizontal non-linear processing step ST2Ah includes, as shown in FIG. 23, a zero-crossing decision step ST311$h$ and a signal amplification step ST312$h$, and the vertical non-linear processing step ST2Av includes, as shown in FIG. 24, a zero-crossing decision step ST311$v$ and a signal amplification step ST312$v$.

Figure 25:
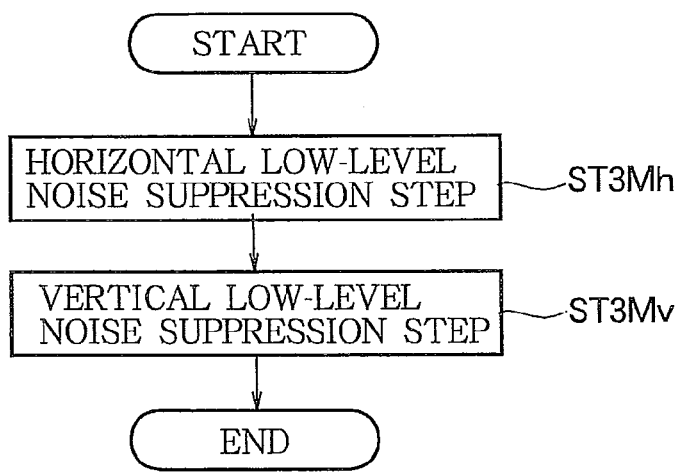
FIG. 25 is a flowchart illustrating processing in the first intermediate image processing step ST3M in FIG. 20.

The first intermediate image processing step ST3M includes, as shown in FIG. 25, a horizontal low-level noise suppression step ST3Mh and a vertical low-level noise suppression step ST3Mv.

Figure 26:
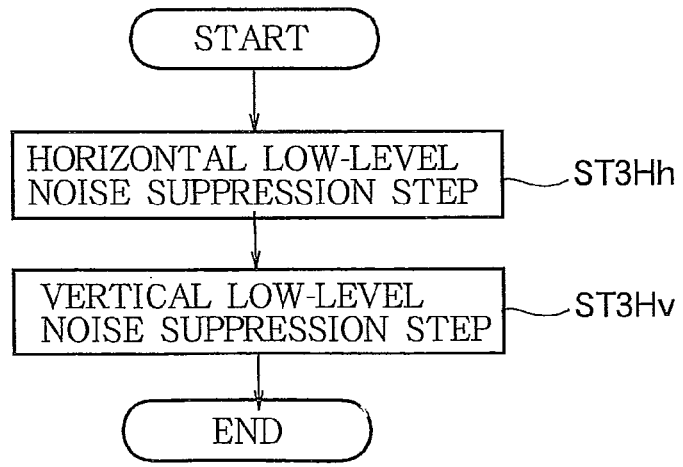
FIG. 26 is a flowchart illustrating processing in the second intermediate image processing step ST3H in FIG. 20.

The second intermediate image processing step ST3H includes, as shown in FIG. 26, a horizontal low-level noise suppression step ST3Hh and a vertical low-level noise suppression step ST3Hv.

First the operation in the first intermediate image generating step ST1 will be described with reference to the flowchart in FIG. 21.

In the high-frequency component image generating step ST1A, the following processing is performed on an input image DIN input in an image input step, which is not shown.

In the horizontal high-frequency component image generating step ST1Ah, horizontal high-pass filter processing is performed to generate an image D1Ah by extracting horizontal high-frequency components from the input image DIN.

In the vertical high-frequency component image generating step ST1Av, vertical high-pass filter processing is performed to generate an image D1Av by extracting vertical high-frequency components from the input image DIN.

The high-frequency component image generating step ST1A performs the same processing as performed by the high-frequency component image generating means 1A, generating an image D1A including image D1Ah and image D1Av from the input image DIN. The operations performed are equivalent to the operations performed by the high-frequency component image generating means 1A.

In the low-frequency component image generating step ST1B, the following processing is performed on image D1A. In the horizontal low-frequency component image generating step ST1Bh, horizontal low-pass filter processing is performed to generate an image D1Bh by extracting horizontal low-frequency components from image D1Ah.

In the vertical low-frequency component image generating step ST1Bv, vertical low-pass filter processing is performed to generate an image D1Bv by extracting vertical low-frequency components from image D1Av.

The low-frequency component image generating step ST1B performs the same processing as performed by the low-frequency component image generating means 1B, generating an image D1B including image D1Bh and image D1Bv from image D1A. The operations performed are equivalent to the operations performed by the low-frequency component image generating means 1B.

The first intermediate image generating step ST1 operates as described above, using image D1Bh as an image D1$h$, using image D1Bv as an image D1$v$, and outputting an intermediate image D1 including image D1$h$ and image D1$v$. The above operations are equivalent to the operations performed by the first intermediate image generating means 1.

Next the operation of the second intermediate image generating step ST2 will be described with reference to the flowcharts in FIGS. 22 to 24.

In the non-linear processing step ST2A, the following processing is performed on intermediate image D1.

In the horizontal non-linear processing step ST2Ah, processing is performed according to the flowchart shown in FIG. 23 to generate an image D2Ah from image D1$h$. The processing according to the flowchart shown in FIG. 23 is as follows. The pixel values in image D1$h$ are checked for changes in the horizontal direction in the zero-crossing decision step ST311$h$. A point where the pixel value changes from positive to negative or from negative to positive is identified as a zero-crossing point, and the pixels to the left and right of the zero-crossing point are reported to the signal amplification step ST312$h$. In the signal amplification step ST312$h$, the pixel values of the pixels reported as being to the left and right of the zero-crossing point are amplified in image D1$h$, and the image is output as image D2Ah. That is, image D2Ah is generated in the non-linear processing step ST2Ah by performing on image D1$h$ the same processing as performed in the horizontal non-linear processing means 2Ah.

In the vertical non-linear processing step ST2Av, processing is performed according the flowchart shown in FIG. 24 to generate an image D2Av from image D1$v$. The processing according to the flowchart shown in FIG. 24 is as follows. The pixel values in image D1$v$ are checked for changes in the vertical direction in the zero-crossing decision step ST311$v$. A point where the pixel value changes from positive to negative or from negative to positive is identified as a zero-crossing point, and the pixels immediately above and below the zero-crossing point are reported to the signal amplification step ST312$v$. In the signal amplification step ST312$v$, the pixel values of the pixels reported as being immediately above and below the zero-crossing point are amplified in image D1$v$, and the image is output as image D2Av. That is, image D2Av is generated in the non-linear processing step ST2Av by performing on image D1$v$ the same processing as performed in the vertical non-linear processing means 2Av.

The non-linear processing step ST2A operates as described above to generate an image D2A including images D2Ah and D2Av. The above operations are equivalent to the operations performed by the non-linear processing means 2A.

Next, in the high-frequency component image generating step ST2B, the following processing is performed on image D2A.

First an image D2Bh is generated by performing horizontal high-pass filter processing on image D2Ah in the horizontal high-frequency component image generating step ST2Bh. The horizontal high-frequency component image generating step ST2Bh performs processing similar to that performed in the horizontal high-frequency component image generating means 2Bh.

Next, an image D2Bv is generated by performing vertical high-pass filter processing on image D2Av in the vertical high-frequency component image generating step ST2Bv. The vertical high-frequency component image generating step ST2Bv thus performs processing similar to that performed in the vertical high-frequency component image generating means 2Bv.

The high-frequency component image generating step ST2B operates as described above to generate an image D2B including image D2Bh and image D2Bv. The above operations are equivalent to the operations performed by the high-frequency component image generating means 2B.

The second intermediate image generating step ST2 operates as described above, outputting image D2B as an intermediate image D2. That is, it outputs an intermediate image D2 including image D2Bh as image D2$h$ and image D2Bv as image D2$v$. The above operations are equivalent to the operations performed by the second intermediate image generating means 2.

Next the operation of the first intermediate image processing step ST3M will be described with reference to the flowchart in FIG. 25.

The first intermediate image processing step ST3M performs low-level noise suppression processing on intermediate image D1 to generate intermediate image D3M. Since intermediate image D1 includes images D1$h$ and D1$v$, first an image D3Mh is generated by performing low-level noise suppression processing on image D1$h$ in the horizontal low-level noise suppression step ST3Mh, and then an image D3Mv is generated by performing low-level noise suppression processing on image D1$v$ in the vertical low-level noise suppression step ST3Mv. An intermediate image D3M including images D3Mh and D3Mv is also generated. The details of the low-level noise suppression processing are as described in the first embodiment, so a description will be omitted.

By operating as described above, the first intermediate image processing step ST3M operates in the same way as the first intermediate image processing means 3M.

Next, the operation in the second intermediate image processing step ST3H will now be described with reference to the flowchart in FIG. 26.

The second intermediate image processing step ST3H performs low-level noise suppression processing on intermediate image D2 to generate intermediate image D3H. Since intermediate image D2 includes images D2$h$ and D2$v$, first an image D3Hh is generated by performing low-level noise suppression processing on image D2$h$ in the horizontal low-level noise suppression step ST3Hh, and then an image D3Hv is generated by performing low-level noise suppression processing on image D2$v$ in the vertical low-level noise suppression step ST3Hv. An intermediate image D3H including images D3Hh and D3Hv is also generated. The details of the low-level noise suppression processing are as described in the first embodiment, so a description will be omitted.

By operating as described above, the second intermediate image processing step ST3H operates in the same way as the second intermediate image processing means 3H.

In the adding step ST4, the input image DIN, intermediate image D3M, and intermediate image D3H are added together to generate the output image DOUT. Intermediate image D3M includes image D3Mh and image D3Mv, and intermediate image D3H includes image D3Hh and image D3Hv, so images D3Mh, D3Mv, D3Hh, and D3Hv are added to the input image DIN in the adding step ST4. The addition of images D3Mh, D3Mv, D3Hh, and D3Hv to the input image DIN may be simple addition or weighted addition. The output image DOUT is output as a final output image by the image processing method in this embodiment. By operating as described above, the adding step ST4 operates equivalently to the adding means 4.

The image processing method in this invention operates as described above.

As is clear from the preceding description, the image processing method in this embodiment and the image processing apparatus in the first embodiment operate equivalently. Therefore, the image processing method in this invention has the same effects as the image processing apparatus in the first embodiment. If the image processing method described above is carried out in the image processing apparatus U2 in the image display apparatus shown in FIG. 9, for example, the image processed by the image processing method can be displayed by the image display apparatus shown in FIG. 9.

EXPLANATION OF REFERENCE CHARACTERS 1 first intermediate image generating means, 2 second intermediate image generating means, 3M first intermediate image processing means, 3H second intermediate image processing means, 4 adding means, DIN input image, D1 intermediate image, D2 intermediate image, D3M intermediate image, D3H intermediate image, DOUT output image.

What is claimed is:

1. An image processing apparatus, to which an enlarged image obtained by enlarging an original image is input as an input image, said image processing apparatus comprising:
   a bandpass filter that generates a first intermediate image obtained by extracting a component of the input image in a particular frequency band by removing a low-frequency component and a high-frequency component from the input image;
   a non-linear processor configured to generate a non-linearly processed image by amplifying the pixel values in the first intermediate image by an amplification factor determined for each pixel, the non-linear processor including zero-crossing decision logic that identifies a point where a pixel value in the first intermediate image changes from positive to negative or from negative to positive as a zero-crossing point, and an amplifier that amplifies each pixel preceding and following each position which has been identified to be a zero-crossing point by a factor greater than 1 and amplifies other pixels by a factor equal to 1 to generate a non-linearly processed image;
   a first noise filter that suppresses low-level noise included in the second intermediate image; and
   an adder configured to add, to the input image, the image output by the first noise filter,
   wherein said bandpass filter includes
      a first high-frequency component filter that generates a first high-frequency component image by extracting a high-frequency component from the input image; and
      a low-frequency component filter that generates the first intermediate image by extracting only a low-frequency component from the first high-frequency component image.

2. The image processing apparatus of claim 1, wherein the non-linear processor further comprises:
   a filter that generates a second high-frequency component image by extracting only a high-frequency component from the non-linearly processed image.

3. The image processing apparatus of claim 1, wherein:
   the first high-frequency component filter includes a first horizontal high-frequency component filter that generates a first horizontal high-frequency component image by extracting a high-frequency component from the input image by using pixels in a horizontal vicinity of each pixel in the input image;
   the low-frequency component filter includes a horizontal low-frequency component filter that generates a first horizontal intermediate image by extracting only a low-frequency component from the first horizontal high-frequency component image;
   the first intermediate image includes the first horizontal intermediate image;
   the zero-crossing decision logic includes horizontal zero-crossing decision logic that identifies a point where the pixel values in the first horizontal intermediate image change, in the horizontal direction, from positive to negative or from negative to positive as a horizontal zero-crossing point, and
   the amplifier includes a horizontal signal amplifier that amplifies each pixel preceding and following each position identified as a horizontal zero-crossing point, by a factor greater than 1, and amplifies other pixels by a factor equal to 1, to generate a horizontal non-linearly processed image; and
   the non-linearly processed image includes the horizontal non-linearly processed image.

4. The image processing apparatus of claim 3, wherein the non-linear processor further comprises a second horizontal high-frequency component filter that generates a second horizontal high-frequency component image by extracting only a high-frequency component from the horizontal non-linearly processed image.

5. The image processing apparatus of claim 3, wherein the adder also adds the first intermediate image to the input image.

6. The image processing apparatus of claim 3, further comprising a second noise filter that suppresses low-level noise included in the first intermediate image, and
   wherein said adder also adds the image output by the second noise filter to the input image.

7. The image processing apparatus of claim 1, wherein:
   the first high-frequency component filter includes a first vertical high-frequency component filter that generates a first vertical high-frequency component image by extracting a high-frequency component from the input image by using pixels in a vertical vicinity of each pixel in the input image;
   the low-frequency component filter includes a vertical low-frequency component filter that generates a first vertical intermediate image by extracting only a low-frequency component from the first vertical high-frequency component image;
   the first intermediate image includes the first vertical intermediate image;
   the zero-crossing decision logic includes vertical zero-crossing decision logic that identifies a point where the pixel values in the first vertical intermediate image change, in the vertical direction, from positive to negative or from negative to positive as a vertical zero-crossing point, and
   the signal amplifier includes a vertical signal amplifier that amplifies each pixel preceding and following each position identified as a vertical zero-crossing point, by a factor greater than 1, and amplifies other pixels by a factor equal to 1, to generate a vertical nonlinearly processed image; and the non-linearly processed image includes the vertical non-linearly processed image.

8. The image processing apparatus of claim 7, wherein the non-linear processor includes a second vertical high-frequency component filter that generates a second vertical high-frequency component image by extracting only a high-frequency component from the vertical nonlinearly processed image.

9. The image processing apparatus of claim 7, wherein the adder also adds the first intermediate image to the input image.

10. The image processing apparatus of claim 7, further comprising a second noise filter that suppresses low-level noise included in the first intermediate image, and said adder also adds the image output by the second noise filter unit to the input image.

11. An image display apparatus including the image processing apparatus of claim 1.

12. An image processing method, to which an enlarged image obtained by enlarging an original image is input as an input image, said image processing method comprising:

a first intermediate image generating step for generating a first intermediate image obtained by extracting a component of the input image in a particular frequency band by removing a low-frequency component and a high-frequency component from the input image;

non-linear processing step for generating a non-linearly processed image by amplifying the pixel values in the first intermediate image by an amplification factor determined for each pixel, the non-linear processing step including identifying a point where a pixel value in the first intermediate image changes from positive to negative or from negative to positive as a zero-crossing point, and amplifying each pixel preceding and following each position which has been identified to be a zero-crossing point by a factor greater than 1 and amplifying other pixels by a factor equal to 1 to generate a non-linearly processed image;

an intermediate image processing step for generating an image by suppressing low-level noise included in the non-linearly processed image; and an adding step for adding, to the input image, the image output by the non-linear processing step; wherein said first intermediate image generating step comprises:

a first high-frequency component image generating step for generating a first high-frequency component image by extracting a high-frequency component from the input image; and a low-frequency component image generating step for generating the first intermediate image by extracting only a low-frequency component from the first high-frequency component image.

* * * * *